US009633040B2

(12) United States Patent
Lee

(10) Patent No.: US 9,633,040 B2
(45) Date of Patent: Apr. 25, 2017

(54) DISTRIBUTED PROCESSING SYSTEM INCLUDING A NAME NODE AND A PLURALITY OF DATA NODES, AND METHOD OF OPERATING THE SAME

(71) Applicant: SAMSUNG ELECTRONICS CO., LTD., Suwon-si, Gyeonggi-do (KR)

(72) Inventor: Jong-Won Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 214 days.

(21) Appl. No.: 14/516,692

(22) Filed: Oct. 17, 2014

(65) Prior Publication Data

US 2015/0222695 A1   Aug. 6, 2015

(30) Foreign Application Priority Data

Feb. 4, 2014   (KR) ........................ 10-2014-0012577

(51) Int. Cl.
  *G06F 15/16*   (2006.01)
  *G06F 17/30*   (2006.01)
  *H04L 29/12*   (2006.01)
  *H04L 12/24*   (2006.01)

(52) U.S. Cl.
  CPC ........ *G06F 17/30194* (2013.01); *H04L 41/12* (2013.01); *H04L 61/103* (2013.01); *H04L 61/6022* (2013.01)

(58) Field of Classification Search
  CPC ............... G06F 17/30194; H04L 41/12; H04L 61/6022; H04L 61/103
  See application file for complete search history.

(56) References Cited

U.S. PATENT DOCUMENTS

| 2005/0251802 | A1* | 11/2005 | Bozek | ............... G06F 9/5077 718/1 |
| 2006/0195608 | A1* | 8/2006 | Tanaka | ............... H04L 67/1008 709/238 |
| 2010/0306286 | A1 | 12/2010 | Chiu et al. | |
| 2011/0154350 | A1 | 6/2011 | Doyle et al. | |

(Continued)

FOREIGN PATENT DOCUMENTS

| JP | 2010-218307 | 9/2010 |
| JP | 2012-160014 | 8/2012 |

(Continued)

*Primary Examiner* — Mohamed Wasel
(74) *Attorney, Agent, or Firm* — F. Chau & Associates, LLC

(57) ABSTRACT

A method of operating a distributed processing system including a name node and a plurality of data nodes includes transmitting an address request packet from the name node to each of the plurality of data nodes, transmitting an address packet from each of the plurality of data nodes to the name node upon receiving the address request packet at each of the plurality of data nodes and upon each of the plurality of data nodes storing its own media access control (MAC) address in a payload of the address packet as a data node MAC address, determining, by the name node, a node configuration of the distributed processing system based on the address packet received from each of the plurality of data nodes, and processing data using a selected data node from among the plurality of data nodes based on the node configuration.

19 Claims, 16 Drawing Sheets

(56) References Cited

U.S. PATENT DOCUMENTS

| | | | |
|---|---|---|---|
| 2011/0206047 A1* | 8/2011 | Donthamsetty | H04L 12/4641 370/392 |
| 2012/0072567 A1* | 3/2012 | Yin | G06F 13/102 709/223 |
| 2012/0101991 A1 | 4/2012 | Srivas et al. | |
| 2012/0209943 A1 | 8/2012 | Jung | |
| 2012/0304186 A1 | 11/2012 | Balmin et al. | |
| 2013/0014100 A1* | 1/2013 | Akiyama | G06F 11/3612 717/176 |
| 2013/0031558 A1 | 1/2013 | Balmin et al. | |
| 2013/0254196 A1* | 9/2013 | Babu | G06F 17/30595 707/736 |
| 2014/0059000 A1* | 2/2014 | Hosouchi | G06F 17/30289 707/609 |
| 2014/0236950 A1* | 8/2014 | Kim | G06F 17/30598 707/737 |
| 2014/0301391 A1* | 10/2014 | Krishnan | H04L 45/66 370/390 |
| 2015/0040127 A1* | 2/2015 | Dippenaar | G06F 9/4856 718/1 |
| 2015/0199208 A1* | 7/2015 | Huang | G06F 9/45533 718/1 |
| 2016/0154664 A1* | 6/2016 | Iwamatsu | G06F 9/45558 718/1 |

FOREIGN PATENT DOCUMENTS

| | | |
|---|---|---|
| JP | 2012-203421 | 10/2012 |
| JP | 2013-003982 | 1/2013 |
| JP | 2013-041574 | 2/2013 |
| JP | 2013-088863 | 5/2013 |
| KR | 1020130019698 | 2/2013 |
| KR | 1020130022506 | 3/2013 |
| KR | 1020130027949 | 3/2013 |

\* cited by examiner

| NODE | PHYSICAL HOST | VIRTUAL MACHINE |
|---|---|---|
| DN1 | P_MAC2 | YES |
| DN2 | P_MAC2 | YES |
| DN3 | P_MAC2 | YES |
| DN4 | P_MAC3 | NO |
| DN5 | P_MAC4 | YES |
| DN6 | P_MAC4 | YES |
| DN7 | P_MAC4 | YES |

| NODE | PHYSICAL HOST | VIRTUAL MACHINE |
|------|---------------|-----------------|
| DN1  | P_MAC2        | YES             |
| DN2  | P_MAC2        | YES             |
| DN3  | P_MAC2        | YES             |
| DN4  | P_MAC3        | NO              |
| DN5  | P_MAC4        | YES             |
| DN6  | P_MAC4        | YES             |
| DN7  | P_MAC4        | YES             |
| DN8  | P_MAC1        | YES             |
| DN9  | P_MAC1        | YES             |
| NN   | P_MAC1        | YES             |

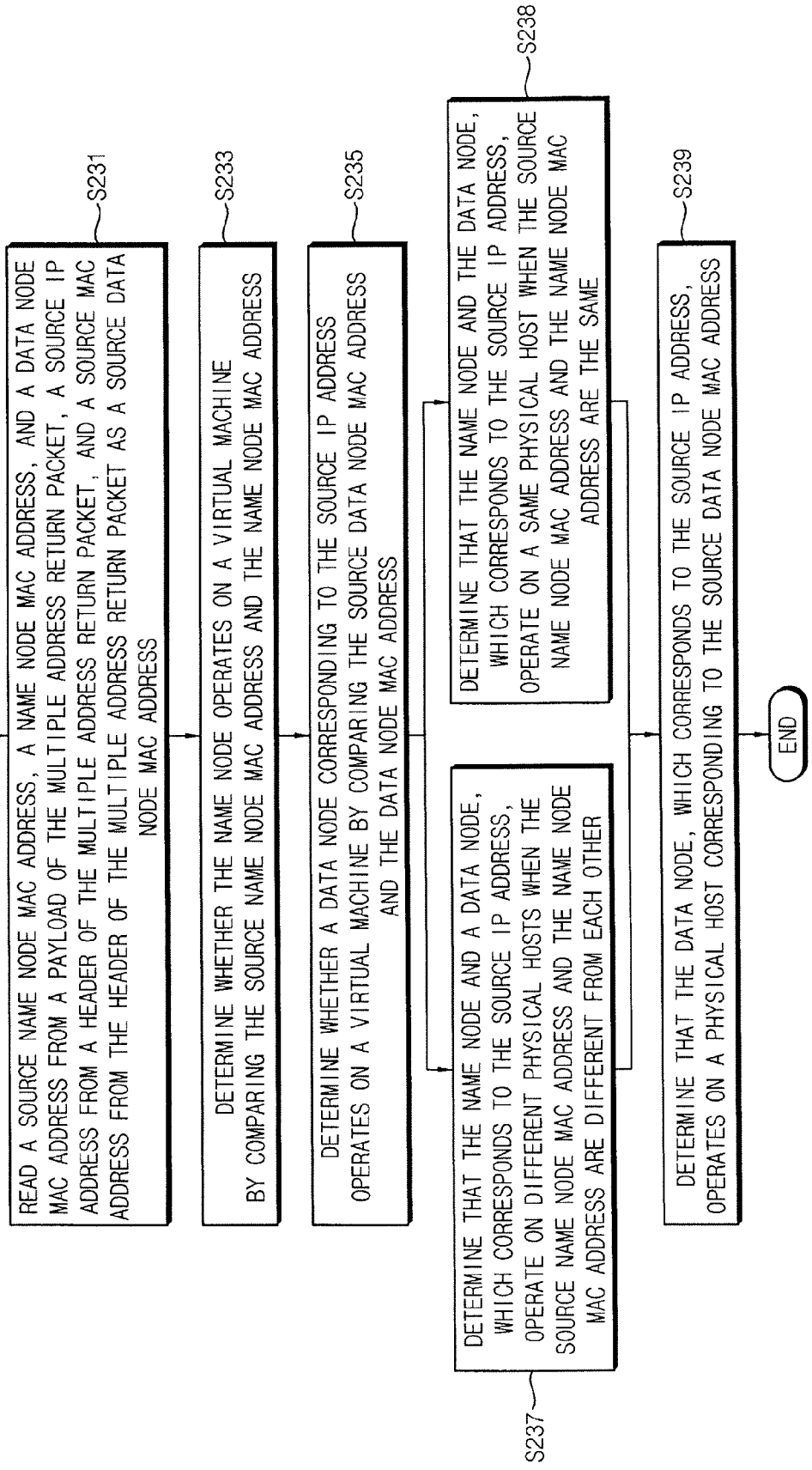

DISTRIBUTED PROCESSING SYSTEM INCLUDING A NAME NODE AND A PLURALITY OF DATA NODES, AND METHOD OF OPERATING THE SAME

CROSS-REFERENCE TO RELATED APPLICATIONS

This application claims priority under 35 U.S.C. §119 to Korean Patent Application No. 10-2014-0012577, filed on Feb. 4, 2014, the disclosure of which is incorporated by reference herein in its entirety.

TECHNICAL FIELD

Exemplary embodiments of the present inventive concept relate to a data processing system, and more particularly, to a distributed processing system and a method of operating the distributed processing system.

DISCUSSION OF THE RELATED ART

The amount of data associated with Internet service markets has increased. Internet portals may deploy large scale clusters for distributed management of big data and distributed data processing using, for example, HADOOP by The Apache Software Foundation.

HADOOP may be operated in virtual environments for enhanced performance. When HADOOP is operated in virtual environments, a node included in HADOOP may migrate between physical hosts. If migration of a node occurs, a node configuration is changed such that HADOOP is required to be rebooted after updating a node configuration file representing the node configuration.

SUMMARY

Exemplary embodiments of the present inventive concept provide a distributed processing system that operates without a reboot even in a case in which migration of a node occurs in virtual environments.

Exemplary embodiments provide a method of operating a distributed processing system without a reboot even in a case in which migration of a node occurs in virtual environments.

According to an exemplary embodiment, in a method of operating a distributed processing system including a name node and a plurality of data nodes, an address request packet is transmitted from the name node to each of the plurality of data nodes. Upon receiving the address request packet, each of the plurality of data nodes transmits an address packet to the name node after each of the plurality of data nodes stores its own media access control (MAC) address in a payload of the address packet as a data node MAC address. The name node determines a node configuration of the distributed processing system based on the address packet received from each of the plurality of data nodes. The name node processes data using a selected data node that is selected from among the plurality of data nodes based on the node configuration.

In exemplary embodiments, at least one node from among the name node and the plurality of data nodes may operate on a virtual machine.

In exemplary embodiments, when receiving the address request packet from the name node, each of the plurality of data nodes may read a MAC address from an internal register, store the read MAC address in the payload of the address packet as the data node MAC address, and transmit the address packet to the name node.

In exemplary embodiments, the name node may determine the node configuration based on a source MAC address included in a header of the address packet and the data node MAC address included in the payload of the address packet.

In exemplary embodiments, determining, by the name node, the node configuration based on the address packet received from each of the plurality of data nodes may include reading a source MAC address and a source internet protocol (IP) address from a header of the address packet and the data node MAC address from the payload of the address packet, and determining whether a data node corresponding to the source IP address operates on a virtual machine by comparing the source MAC address and the data node MAC address.

The name node may determine that the data node corresponding to the source IP address operates on the virtual machine when the source MAC address and the data node MAC address are different from each other.

Determining, by the name node, the node configuration based on the address packet received from each of the plurality of data nodes may further include determining that the data node corresponding to the source IP address operates on a physical host corresponding to the source MAC address.

The name node may determine that data nodes, which correspond to the source IP addresses included in the address packets having a same source MAC address in the header, operate on a same physical host.

In exemplary embodiments, the name node may select data nodes operating on a virtual machine from among the plurality of data nodes as virtual data nodes based on the node configuration, and repeatedly transmit the address request packet to each of the virtual data nodes. Upon receiving the address request packet, each of the virtual data nodes may transmit the address packet to the name node after each of the virtual data nodes stores its own MAC address in the payload of the address packet as the data node MAC address. The name node may update the node configuration based on the address packet received from each of the virtual data nodes.

In exemplary embodiments, the name node may transmit an address return request packet to each of the plurality of data nodes after the name node stores a MAC address of its own in a payload of the address return request packet as a name node MAC address. Upon receiving the address return request packet, each of the plurality of data nodes may transmit an address return packet to the name node after each of the plurality of data nodes stores a source MAC address, which is included in a header of the address return request packet, in a payload of the address return packet as a source name node MAC address, and stores the name node MAC address, which is included in the payload of the address return request packet, in the payload of the address return packet. The name node may determine the node configuration based on the address return packet received from each of the plurality of data nodes.

Determining, by the name node, the node configuration based on the address return packet received from each of the plurality of data nodes may include reading the source name node MAC address and the name node MAC address from the payload of the address return packet and a source Internet Protocol (IP) address from a header of the address return packet, and determining whether the name node operates on a virtual machine by comparing the source name node MAC address and the name node MAC address.

The name node may determine that the name node operates on the virtual machine when the source name node MAC address and the name node MAC address are different from each other in at least one of the address return packets received from the plurality of data nodes.

Determining, by the name node, the node configuration based on the address return packet received from each of the plurality of data nodes may further include determining that the name node and a data node, which corresponds to the source IP address included in the header of the address return packet, operate on different physical hosts when the source name node MAC address and the name node MAC address are different from each other in the address return packet, and determining that the name node and the data node, which corresponds to the source IP address included in the header of the address return packet, operate on a same physical host when the source name node MAC address and the name node MAC address are the same in the address return packet.

The name node may repeatedly transmit the address return request packet to each of the plurality of data nodes after storing the MAC address of its own in the payload of the address return request packet as the name node MAC address, and update the node configuration based on the address return packet received from each of the plurality of data nodes.

In exemplary embodiments, processing data using the selected data node that is selected from among the plurality of data nodes based on the node configuration may include, when receiving a write command and a write data, selecting at least two data nodes operating on different physical hosts from among the plurality of data nodes based on the node configuration, and storing a copy of the write data in the selected at least two data nodes.

In exemplary embodiments, processing data using the selected data node that is selected from among the plurality of data nodes based on the node configuration may include selecting a data node storing a relatively large amount of data from among the plurality of data nodes as a source data node, selecting data nodes operating on a same physical host as the source data node from among the plurality of data nodes as target data nodes based on the node configuration, and moving a portion of data stored in the source data node to a data node storing a relatively small amount of data from among the target data nodes.

In exemplary embodiments, processing data using the selected data node that is selected from among the plurality of data nodes based on the node configuration may include, when receiving a job command, selecting at least two data nodes operating on a same physical host from among the plurality of data nodes based on the node configuration, and allocating a map task and a reduce task to the selected at least two data nodes.

In exemplary embodiments, the distributed processing system may use a HADOOP framework.

According to an exemplary embodiment, in a method of operating a distributed processing system including a name node and a plurality of data nodes, a multiple address return request packet is transmitted from the name node to each of the plurality of data nodes after the name node stores its own media access control (MAC) address in a payload of the multiple address return request packet as a name node MAC address. Upon receiving the multiple address return request packet, each of the plurality of data nodes transmits a multiple address return packet to the name node after each of the plurality of data nodes stores a source MAC address, which is included in a header of the multiple address return request packet, in a payload of the multiple address return packet as a source name node MAC address, stores the name node MAC address, which is included in the payload of the multiple address return request packet, in the payload of the multiple address return packet, and stores its own MAC address in the payload of the multiple address return packet as a data node MAC address. The name node determines a node configuration of the distributed processing system based on the multiple address return packet received from each of the plurality of data nodes. The name node processes data using a selected data node that is selected from among the plurality of data nodes based on the node configuration.

In exemplary embodiments, determining, by the name node, the node configuration based on the multiple address return packet received from each of the plurality of data nodes may include reading the source name node MAC address, the name node MAC address, and the data node MAC address from the payload of the multiple address return packet, a source internet protocol (IP) address from a header of the multiple address return packet, and a source MAC address from the header of the multiple address return packet as a source data node MAC address, determining whether the name node operates on a virtual machine by comparing the source name node MAC address and the name node MAC address, and determining whether a data node corresponding to the source IP address operates on a virtual machine by comparing the source data node MAC address and the data node MAC address.

The name node may determine that the name node operates on a virtual machine when the source name node MAC address and the name node MAC address are different from each other in at least one of the multiple address return packets received from the plurality of data nodes, and determine that the data node corresponding to the source IP address operates on a virtual machine when the source data node MAC address and the data node MAC address are different from each other.

Determining, by the name node, the node configuration based on the multiple address return packet received from each of the plurality of data nodes may further include determining that the name node and a data node, which corresponds to the source IP address included in the header of the multiple address return packet, operate on different physical hosts when the source name node MAC address and the name node MAC address are different from each other in the multiple address return packet, determining that the name node and the data node, which corresponds to the source IP address included in the header of the multiple address return packet, operate on a same physical host when the source name node MAC address and the name node MAC address are the same in the multiple address return packet, and determining that the data node, which corresponds to the source IP address included in the header of the multiple address return packet, operates on a physical host corresponding to the source data node MAC address.

In exemplary embodiments, the name node may repeatedly transmit the multiple address return request packet to each of the plurality of data nodes after storing its own MAC address in the payload of the multiple address return request packet as the name node MAC address, and update the node configuration based on the multiple address return packet received from each of the plurality of data nodes.

According to exemplary embodiments, a distributed processing system includes a plurality of physical hosts and a client terminal. The plurality of physical hosts are connected to each other through a network. The plurality of physical hosts drive a name node and a plurality of data nodes on a virtual machine. The client terminal provides a data processing command to the name node. The name node transmits a multiple address return request packet to each of the plurality of data nodes after storing its own media access control (MAC) address in a payload of the multiple address return request packet as a name node MAC address. When receiving the multiple address return request packet, each of the plurality of data nodes transmits a multiple address return packet to the name node after each of the plurality of data nodes stores a source MAC address, which is included in a header of the multiple address return request packet, in a payload of the multiple address return packet as a source name node MAC address, stores the name node MAC address, which is included in the payload of the multiple address return request packet, in the payload of the multiple address return packet, and stores its own MAC address in the payload of the multiple address return packet as a data node MAC address. The name node determines a node configuration, which represents on which physical host the name node and each of the plurality of data nodes operate, based on the multiple address return packet received from each of the plurality of data nodes, and performs the data processing command using a selected data node that is selected from among the plurality of data nodes based on the node configuration.

In exemplary embodiments, at least one node from among the name node and the plurality of data nodes may migrate between the plurality of physical hosts while turning on. The name node may repeatedly transmit the multiple address return request packet to each of the plurality of data nodes after storing its own MAC address in the payload of the multiple address return request packet as the name node MAC address, and update the node configuration based on the multiple address return packet received from each of the plurality of data nodes.

In exemplary embodiments, a distributed processing system includes a plurality of physical hosts connected to each other through a network, wherein the plurality of physical hosts are configured to drive a name node and a plurality of data nodes on a virtual machine, and a client terminal configured to provide a data processing command to the name node. The name node transmits an address request packet to each of the plurality of data nodes, each of the plurality of data nodes transmits an address packet to the name node upon receiving the address request packet and upon each of the plurality of data nodes storing its own media access control (MAC) address in a payload of the address packet as a data node MAC address, the name node determines a node configuration of the distributed processing system based on the address packet received from each of the plurality of data nodes, and performs the data processing command using a selected data node that is selected from among the plurality of data nodes based on the node configuration, and the node configuration indicates which physical host the name node and each of the plurality of data nodes operates on.

BRIEF DESCRIPTION OF THE DRAWINGS

The above and other features of the present inventive concept will become more apparent by describing in detail exemplary embodiments thereof with reference to the accompanying drawings, in which:

FIG. 6 is a diagram illustrating an example of a configuration table generated by a name node according to an exemplary embodiment of the present inventive concept.

FIG. 13 is a diagram illustrating an example of a configuration table generated by a name node according to an exemplary embodiment of the present inventive concept.

FIG. 20 is a flowchart illustrating an example of determining the node configuration based on a multiple address return packet of FIG. 19 according to an exemplary embodiment of the present inventive concept.

DETAILED DESCRIPTION OF THE EXEMPLARY EMBODIMENTS

Figure 1:
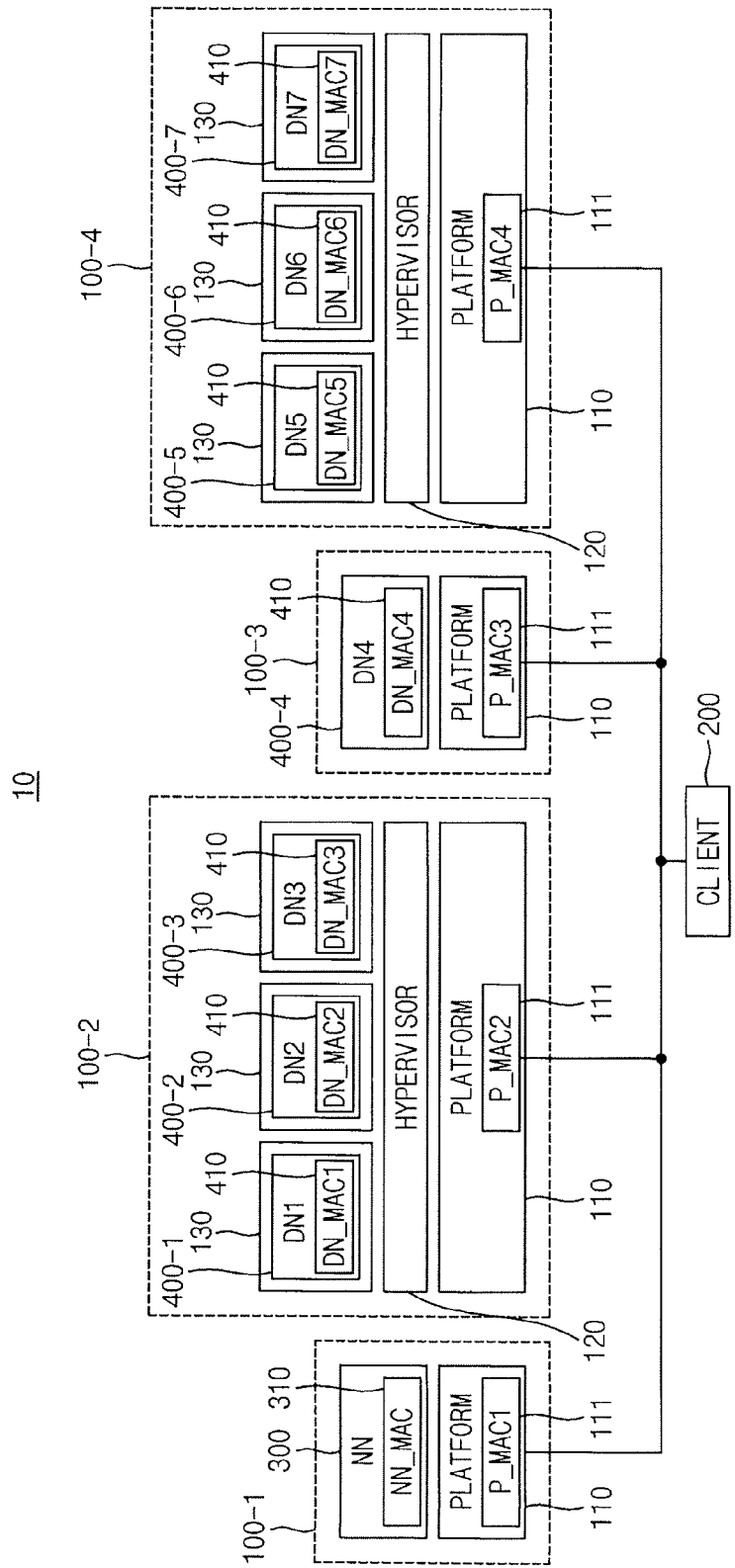
FIG. 1 is a block diagram illustrating a distributed processing system according to an exemplary embodiment of the present inventive concept.

Exemplary embodiments of the present inventive concept will be described more fully hereinafter with reference to the accompanying drawings. Like reference numerals may refer to like elements throughout the accompanying drawings.

It will be understood that although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept.

It will be understood that when an element is referred to as being "connected" or "coupled" to another element, it can be directly connected or coupled to the other element or intervening elements may be present. Other words used to describe the relationship between elements should be interpreted in a like fashion (e.g., "between", "adjacent", etc.).

FIG. 1 is a block diagram illustrating a distributed processing system according to an exemplary embodiment of the present inventive concept.

Referring to FIG. 1, a distributed processing system 10 includes a plurality of physical hosts 100-1, 100-2, 100-3 and 100-4 and a client terminal 200.

At least one name node NN 300 and a plurality of data nodes DN1, DN2, DN3, DN4, DN5, DN6 and DN7 400-1, 400-2, 400-3, 400-4, 400-5, 400-6 and 400-7 operate on the plurality of physical hosts 100-1, 100-2, 100-3 and 100-4.

The client terminal 200 provides a data processing command to the name node 300.

The plurality of physical hosts 100-1, 100-2, 100-3 and 100-4 and the client terminal 200 are connected to each other through a network.

Each of the plurality of physical hosts 100-1, 100-2, 100-3 and 100-4 includes a platform 110 having, for example, hardware and an operating system.

At least one node from among the name node 300 and the plurality of data nodes 400-1, 400-2, 400-3, 400-4, 400-5, 400-6 and 400-7 may operate on a virtual machine 130 that is driven on the plurality of physical hosts 100-1, 100-2, 100-3 and 100-4. In an exemplary embodiment, the name node 300 may operate directly on the platform 110 of a first physical host 100-1, first through third data nodes 400-1, 400-2 and 400-3 may operate on the virtual machine 130 that is driven by a hypervisor 120 on the platform 110 of a second physical host 100-2, a fourth data node 400-4 may operate directly on the platform 110 of a third physical host 100-3, and fifth through seventh data nodes 400-5, 400-6 and 400-7 may operate on the virtual machine 130 that is driven by a hypervisor 120 on the platform 110 of a fourth physical host 100-4.

A unique Internet Protocol (IP) address may be assigned to the name node 300 and each of the plurality of data nodes 400-1, 400-2, 400-3, 400-4, 400-5, 400-6 and 400-7. The name node 300 and each of the plurality of data nodes 400-1, 400-2, 400-3, 400-4, 400-5, 400-6 and 400-7 may communicate with each other using the respective unique IP addresses.

A unique Media Access Control (MAC) address may be assigned to the name node 300 and each of the plurality of data nodes 400-1, 400-2, 400-3, 400-4, 400-5, 400-6 and 400-7. The name node 300 and each of the plurality of data nodes 400-1, 400-2, 400-3, 400-4, 400-5, 400-6 and 400-7 may internally store its respective unique assigned MAC address. For example, the name node 300 may store the assigned MAC address NN_MAC in an internal register 310, and each of the plurality of data nodes 400-1, 400-2, 400-3, 400-4, 400-5, 400-6 and 400-7 may store the assigned MAC address DN_MAC1, DN_MAC2, DN_MAC3, DN_MAC4, DN_MAC5, DN_MAC6 and DN_MAC7 in an internal register 410, respectively.

A unique MAC address may be assigned to each of the plurality of physical hosts 100-1, 100-2, 100-3 and 100-4. For example, as illustrated in FIG. 1, in an exemplary embodiment, a first MAC address P_MAC1 may be assigned to the first physical host 100-1, a second MAC address P_MAC2 may be assigned to the second physical host 100-2, a third MAC address P_MAC3 may be assigned to the third physical host 100-3, and a fourth MAC address P_MAC4 may be assigned to the fourth physical host 100-4. The first through fourth MAC addresses P_MAC1, P_MAC2, P_MAC3 and P_MAC4 assigned to the plurality of physical hosts 100-1, 100-2, 100-3 and 100-4 may correspond to unique serial numbers of network devices 111 included in the platforms 110 of the plurality of physical hosts 100-1, 100-2, 100-3 and 100-4, respectively.

In an exemplary embodiment, the MAC address NN_MAC assigned to the name node 300, which does not operate in virtual environments, may be the same as the first MAC address P_MAC1 assigned to the first physical host 100-1 on which the name node 300 operates. The MAC address DN_MAC4 assigned to the fourth data node 400-4, which does not operate in virtual environments, may be the same as the third MAC address P_MAC3 assigned to the third physical host 100-3 on which the fourth data node 400-4 operates.

The MAC addresses DN_MAC1, DN_MAC2 and DN_MAC3 assigned to the first through third data nodes 400-1, 400-2 and 400-3, which operate on the virtual machine 130, may be different from the second MAC address P_MAC2 assigned to the second physical host 100-2 on which the first through third data nodes 400-1, 400-2 and 400-3 operate. The MAC addresses DN_MAC5, DN_MAC6 and DN_MAC7 assigned to the fifth through seventh data nodes 400-5, 400-6 and 400-7, which operate on the virtual machine 130, may be different from the fourth MAC address P_MAC4 assigned to the fourth physical host 100-4 on which the fifth through seventh data nodes 400-5, 400-6 and 400-7 operate.

A node may communicate with another node operating on a same physical host using its own MAC address. A node may communicate with another node operating on a different physical host using the MAC address of a physical host on which the node operates.

In an exemplary embodiment, the distributed processing system 10 of FIG. 1 may be implemented using, for example, a HADOOP framework. It is to be understood that the exemplary embodiments described herein are not limited to being implemented using a HADOOP framework.

In exemplary embodiments, the distributed processing system 10 may distribute big data to the plurality of data nodes 400-1, 400-2, 400-3, 400-4, 400-5, 400-6 and 400-7 using, for example, a HADOOP distributed file system (HDFS). For example, the name node 300 may divide the big data into a plurality of blocks, and distribute the plurality of blocks to the plurality of data nodes 400-1, 400-2, 400-3, 400-4, 400-5, 400-6 and 400-7. The name node 300 may store metadata corresponding to the big data indicating which data nodes the plurality of blocks are stored. A copy of each of the plurality of blocks may be stored in at least two data nodes for redundancy. Therefore, the distributed processing system 10 according to exemplary embodiments may operate in a stable manner even in a case in which some of the plurality of data nodes 400-1, 400-2, 400-3, 400-4, 400-5, 400-6 and 400-7 stop operating properly.

In exemplary embodiments, the distributed processing system 10 may process the big data distributed in the plurality of data nodes 400-1, 400-2, 400-3, 400-4, 400-5, 400-6 and 400-7 using, for example, a MapReduce. For example, when the name node 300 receives a job command from the client terminal 200 to perform a job on the big data, a job tracker operating on the name node 300 may divide the job into at least one map task and at least one reduce task, select data nodes from among the plurality of data nodes 400-1, 400-2, 400-3, 400-4, 400-5, 400-6 and 400-7, and allocate the at least one map task and the at least one reduce task to the selected data nodes. A task tracker operating on each of the selected data nodes may perform the allocated map task or the allocated reduce task. Therefore, the distributed processing system 10 according to exemplary embodiments may increase the processing speed of the big data.

Although the distributed processing system 10 shown in FIG. 1 includes one name node 300, exemplary embodiments are not limited thereto. For example, according to exemplary embodiments, the distributed processing system 10 may further include a secondary name node that backs up the name node 300, or more than two name nodes 300.

In addition, although the distributed processing system 10 shown in FIG. 1 includes first through seventh data nodes 400-1, 400-2, 400-3, 400-4, 400-5, 400-6 and 400-7, exemplary embodiments are not limited thereto. For example, according to exemplary embodiments, the distributed processing system 10 may include any number of data nodes.

Figure 2:
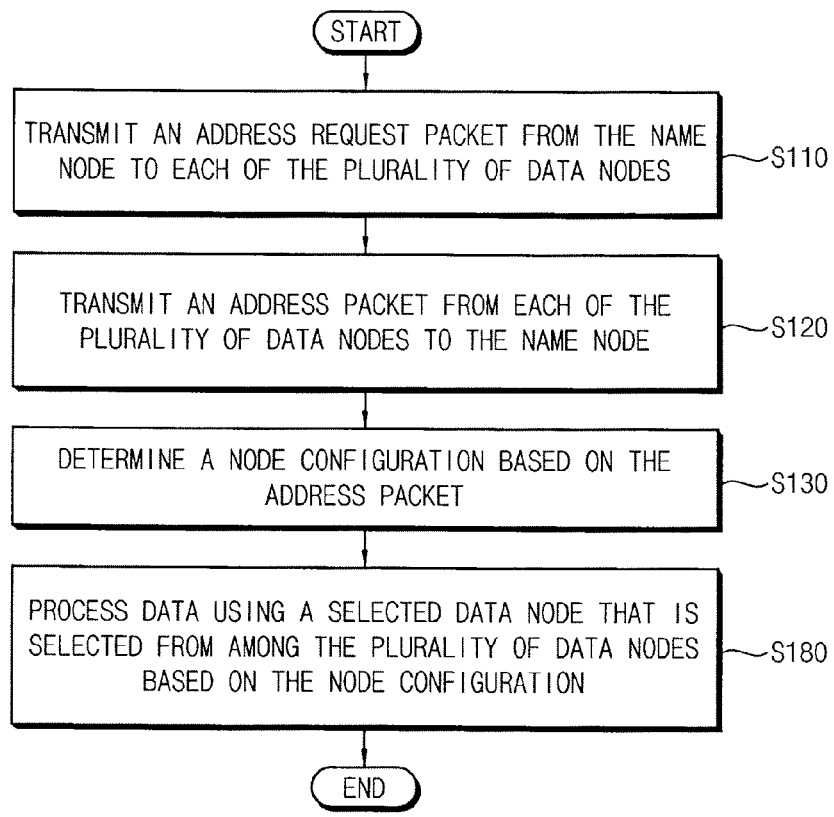
FIG. 2 is a flowchart illustrating a method of operating a distributed processing system according to an exemplary embodiment of the present inventive concept.

FIG. 2 is a flowchart illustrating a method of operating a distributed processing system according to an exemplary embodiment of the present inventive concept.

The method described with reference to FIG. 2 may be performed by the distributed processing system 10 of FIG. 1.

Hereinafter, operation of the distributed processing system 10 will be described with reference to FIGS. 1 to 3.

Referring to FIG. 2, the name node 300 transmits an address request packet P_AR to each of the plurality of data nodes 400-1, 400-2, 400-3, 400-4, 400-5, 400-6 and 400-7 at operation S110.

Figure 3:
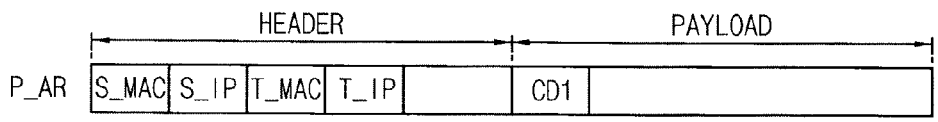
FIG. 3 is a diagram illustrating an example of an address request packet according to an exemplary embodiment of the present inventive concept.

FIG. 3 is a diagram illustrating an example of an address request packet according to an exemplary embodiment of the present inventive concept.

Referring to FIG. 3, the address request packet P_AR may include, for example, a header and a payload.

The name node 300 may store a first code CD1, which has a predetermined value, in the payload of the address request packet P_AR, and may then transmit the address request packet P_AR to each of the plurality of data nodes 400-1, 400-2, 400-3, 400-4, 400-5, 400-6 and 400-7.

In the distributed processing system 10 of FIG. 1, the name node 300 may operate on the first physical host 100-1 that is different from the second through fourth physical hosts 100-2, 100-3 and 100-4 on which the plurality of data nodes 400-1, 400-2, 400-3, 400-4, 400-5, 400-6 and 400-7 operate. Therefore, the address request packet P_AR generated by the name node 300 may be provided to the platform 110 of the first physical host 100-1. The platform 110 of the first physical host 100-1 may change a source MAC address S_MAC, a source IP address S_IP, a target MAC address T_MAC, and a target IP address T_IP, which are included in the header of the address request packet P_AR, and may then transmit the address request packet P_AR to each of the plurality of data nodes 400-1, 400-2, 400-3, 400-4, 400-5, 400-6 and 400-7. Therefore, the source MAC address S_MAC included in the header of the address request packet P_AR may correspond to the first MAC address P_MAC1 of the first physical host 100-1, the source IP address S_IP included in the header of the address request packet P_AR may correspond to the IP address of the name node 300, the target MAC address T_MAC included in the header of the address request packet P_AR may correspond to the MAC address of a physical host on which a destination data node receiving the address request packet P_AR operates, and the target IP address T_IP included in the header of the address request packet P_AR may correspond to the IP address of the destination data node.

Referring again to FIG. 2, when receiving the address request packet P_AR from the name node 300, each of the plurality of data nodes 400-1, 400-2, 400-3, 400-4, 400-5, 400-6 and 400-7 transmits an address packet P_A to the name node 300 after storing its own MAC address, which is stored in the respective internal register 410, in a payload of the address packet P_A as a data node MAC address DN_MAC at operation S120.

Figure 4:
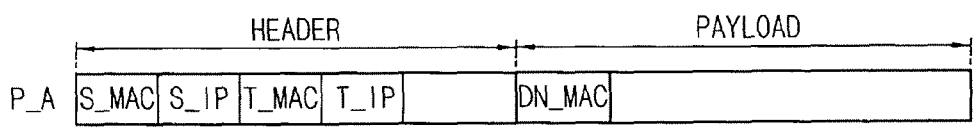
FIG. 4 is a diagram illustrating an example of an address packet according to an exemplary embodiment of the present inventive concept.

FIG. 4 is a diagram illustrating an example of an address packet according to an exemplary embodiment of the present inventive concept.

Referring to FIG. 4, the address packet P_A may include, for example, a header and a payload.

Each of the plurality of data nodes 400-1, 400-2, 400-3, 400-4, 400-5, 400-6 and 400-7 may determine whether the address request packet P_AR is received from the name node 300 using the first code CD1 stored in the payload of the address request packet P_AR.

When receiving the address request packet P_AR from the name node 300, each of the plurality of data nodes 400-1, 400-2, 400-3, 400-4, 400-5, 400-6 and 400-7 may read the MAC address DN_MAC1, DN_MAC2, DN_MAC3, DN_MAC4, DN_MAC5, DN_MAC6 and DN_MAC7 stored in the respective internal register 410, store the read MAC address in the payload of the address packet P_A as the data node MAC address DN_MAC, and transmit the address packet P_A to the name node 300.

In the distributed processing system 10 of FIG. 1, the plurality of data nodes 400-1, 400-2, 400-3, 400-4, 400-5, 400-6 and 400-7 may operate on the second through fourth physical hosts 100-2, 100-3 and 100-4 that are different from the first physical host 100-1 on which the name node 300 operates. Therefore, the address packet P_A generated by each of the plurality of data nodes 400-1, 400-2, 400-3, 400-4, 400-5, 400-6 and 400-7 may be provided to the respective platform 110 of the second through fourth physical hosts 100-2, 100-3 and 100-4. The platform 110 of the second through fourth physical hosts 100-2, 100-3 and 100-4 may change a source MAC address S_MAC, a source IP address S_IP, a target MAC address T_MAC, and a target IP address T_IP, which are included in the header of the address packet P_A, and may then transmit the address packet P_A to the name node 300. Therefore, the source MAC address S_MAC included in the header of the address packet P_A may correspond to the MAC address of a physical host on which an origination data node transmitting the address packet P_A operates, the source IP address S_IP included in the header of the address packet P_A may correspond to the IP address of the origination data node, the target MAC address T_MAC included in the header of the address packet P_A may correspond to the first MAC address P_MAC1 of the first physical host 100-1 on which the name node 300 operates, and the target IP address T_IP included in the header of the address packet P_A may correspond to the IP address of the name node 300.

Referring again to FIG. 2, the name node 300 determines a node configuration of the distributed processing system 10, which represents connection information between the name node 300 and the plurality of data nodes 400-1, 400-2, 400-3, 400-4, 400-5, 400-6 and 400-7 included in the distributed processing system 10, based on the address packet P_A received from each of the plurality of data nodes 400-1, 400-2, 400-3, 400-4, 400-5, 400-6 and 400-7 at operation S130. The node configuration may be stored, for example, as data in a node configuration file in a memory device.

For example, the node configuration may indicate whether each of the plurality of data nodes 400-1, 400-2, 400-3, 400-4, 400-5, 400-6 and 400-7 operates on the virtual machine 130, and may indicate on which physical host each of the plurality of data nodes 400-1, 400-2, 400-3, 400-4, 400-5, 400-6 and 400-7 operates.

In exemplary embodiments, the name node 300 may determine the node configuration based on the source MAC address S_MAC included in the header of the address packet P_A and the data node MAC address DN_MAC included in the payload of the address packet P_A.

Figure 5:
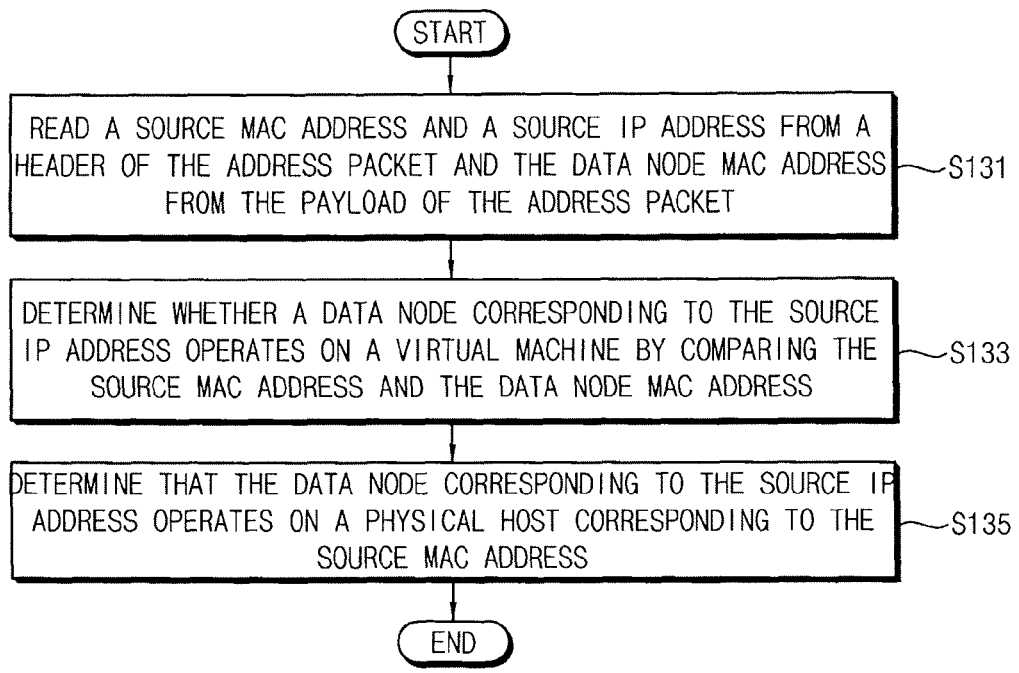
FIG. 5 is a flowchart illustrating an example of determining the node configuration based on an address packet of FIG. 2 according to an exemplary embodiment of the present inventive concept.

FIG. 5 is a flowchart illustrating an example of determining the node configuration based on an address packet of FIG. 2 according to an exemplary embodiment of the present inventive concept.

Referring to FIG. 5, the name node 300 may read the source MAC address S_MAC and the source IP address S_IP from the header of the address packet P_A, and may read the data node MAC address DN_MAC from the payload of the address packet P_A at operation S131. The name node 300 may determine whether a data node corresponding to the source IP address S_IP operates on the virtual machine 130 by, for example, comparing the source MAC address S_MAC and the data node MAC address DN_MAC at operation S133.

As described above with reference to FIG. 1, the MAC address stored in the internal register 410 of a non-virtual data node (e.g., a data node that operates without the virtual machine 130) such as, for example, the fourth data node 400-4, may be the same as the MAC address of a physical host on which the non-virtual data node operates, and the MAC address stored in the internal register 410 of a virtual data node (e.g., a data node that operates on the virtual machine 130) such as, for example, the first through third data nodes 400-1, 400-2 and 400-3 and the fifth through seventh data nodes 400-5, 400-6 and 400-7, may be different from the MAC address of a physical host on which the virtual data node operates. Therefore, the source MAC address S_MAC and the data node MAC address DN_MAC included in the address packet P_A received from the non-virtual data node, such as the fourth data node 400-4, may be the same, and the source MAC address S_MAC and the data node MAC address DN_MAC included in the address packet P_A received from the virtual data node, such as the first through third data nodes 400-1, 400-2 and 400-3 and the fifth through seventh data nodes 400-5, 400-6 and 400-7, may be different from each other.

Therefore, the name node 300 may determine that the data node corresponding to the source IP address S_IP operates on the virtual machine 130 when the source MAC address S_MAC and the data node MAC address DN_MAC are different from each other, and may determine that the data node corresponding to the source IP address S_IP operates without the virtual machine 130 when the source MAC address S_MAC and the data node MAC address DN_MAC are the same.

Regardless of whether each of the plurality of data nodes 400-1, 400-2, 400-3, 400-4, 400-5, 400-6 and 400-7 operates on the virtual machine 130, the source MAC address S_MAC included in the header of the address packet P_A received from each of the plurality of data nodes 400-1, 400-2, 400-3, 400-4, 400-5, 400-6 and 400-7 may be the same as the MAC address of a physical host on which each of the plurality of data nodes 400-1, 400-2, 400-3, 400-4, 400-5, 400-6 and 400-7 operates. Therefore, the name node 300 may determine that the data node corresponding to the source IP address S_IP operates on a physical host corresponding to the source MAC address S_MAC at operation S135. Thus, the name node 300 may determine that data nodes which correspond to the source IP addresses S_IP included in the address packets P_A having a same source MAC address S_MAC in the header operate on a same physical host corresponding to the same source MAC address S_MAC.

In exemplary embodiments, the name node 300 may generate the node configuration, which represents whether each of the plurality of data nodes 400-1, 400-2, 400-3, 400-4, 400-5, 400-6 and 400-7 operates on the virtual machine 130, as well as on which physical host each of the plurality of data nodes 400-1, 400-2, 400-3, 400-4, 400-5, 400-6 and 400-7 operates, as a configuration table CT. According to exemplary embodiments, the name node 300 may store the configuration table CT in a volatile memory device such as, for example, a dynamic random access memory (DRAM) device, or in a nonvolatile memory device such as, for example, a flash memory device.

FIG. 6 is a diagram illustrating an example of a configuration table generated by a name node according to an exemplary embodiment of the present inventive concept.

Referring to FIG. 6, the configuration table CT may include, for example, a node field, a physical host field and a virtual machine field.

As illustrated in FIG. 6, the name node 300 may store the IP address of each of the plurality of data nodes 400-1, 400-2, 400-3, 400-4, 400-5, 400-6 and 400-7, the MAC address of a physical host on which each of the plurality of data nodes 400-1, 400-2, 400-3, 400-4, 400-5, 400-6 and 400-7 operates, and information indicating whether each of the plurality of data nodes 400-1, 400-2, 400-3, 400-4, 400-5, 400-6 and 400-7 operates in the virtual machine 130 in the node field, the physical host field and the virtual machine field, respectively.

Therefore, the name node 300 may determine which data nodes operate on a same physical host, and which data nodes operate on different physical hosts based on the configuration table CT.

Referring again to FIG. 2, the name node 300 processes data using a selected data node that is selected from among the plurality of data nodes 400-1, 400-2, 400-3, 400-4, 400-5, 400-6 and 400-7 based on the node configuration at operation S180.

For example, when the name node 300 receives the data processing command, the name node 300 may select data nodes operating on a same physical host or select data nodes operating on different physical hosts according to the type of data processing command based on the node configuration, and may perform the data processing command using the selected data nodes.

An operation of the distributed processing system 10 performing the data processing command will be described in detail with reference to FIGS. 14, 15 and 16.

As described above, at least one node from among the name node 300 and the plurality of data nodes 400-1, 400-2, 400-3, 400-4, 400-5, 400-6 and 400-7 may operate on the virtual machine 130.

The virtual machine 130 operating on the plurality of physical hosts 100-1, 100-2, 100-3 and 100-4 may migrate between the plurality of physical hosts 100-1, 100-2, 100-3 and 100-4 while turning on without stopping an operation. When the virtual machine 130 migrates between the plurality of physical hosts 100-1, 100-2, 100-3 and 100-4, a node operating on the virtual machine 130 may also be migrated with the virtual machine 130, and the node configuration may accordingly be changed.

As will be described with reference to FIG. 7, the name node 300 may update the node configuration periodically or aperiodically to update the configuration table CT. Therefore, the distributed processing system 10 may continuously operate without rebooting even in a case in which the plurality of data nodes 400-1, 400-2, 400-3, 400-4, 400-5, 400-6 and 400-7 migrate between the plurality of physical hosts 100-1, 100-2, 100-3 and 100-4.

Figure 7:
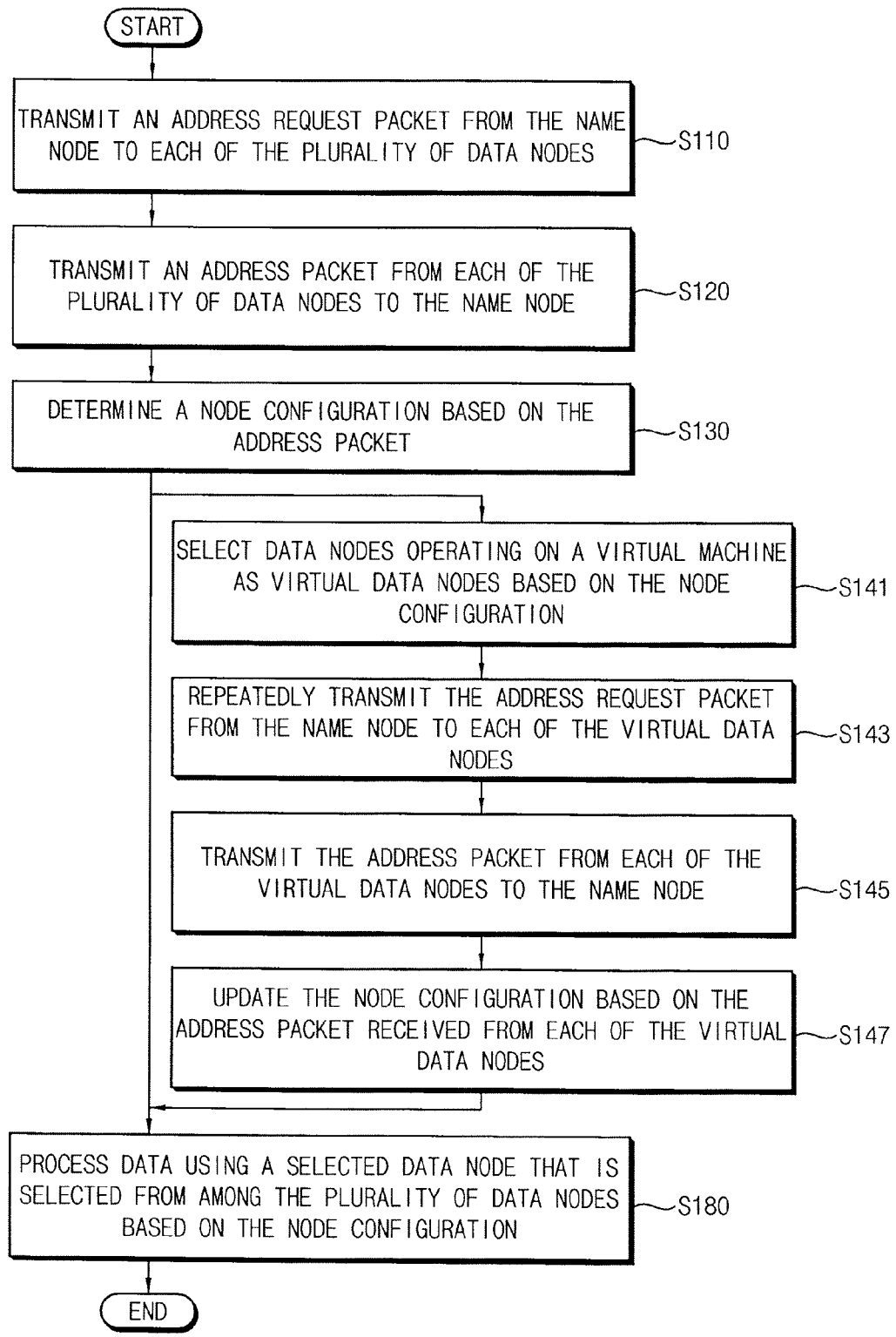
FIG. 7 is a flowchart illustrating an example of the method of operating a distributed processing system in accordance with FIG. 2 according to an exemplary embodiment of the present inventive concept.

FIG. 7 is a flowchart illustrating an example of the method of operating a distributed processing system in accordance with FIG. 2 according to an exemplary embodiment of the present inventive concept.

Referring to FIG. 7, after the name node 300 determines the node configuration at operation S130, the name node 300 may select data nodes operating on the virtual machine 130 from among the plurality of data nodes 400-1, 400-2, 400-3, 400-4, 400-5, 400-6 and 400-7 as virtual data nodes based on the node configuration at operation S141. In the distributed processing system 10 of FIG. 1, the first through third data nodes 400-1, 400-2 and 400-3 and the fifth through seventh data nodes 400-5, 400-6 and 400-7 may be the virtual data nodes. The name node 300 may repeatedly transmit the address request packet P_AR to each of the virtual data nodes 400-1, 400-2, 400-3, 400-5, 400-6 and 400-7 at operation S143. In exemplary embodiments, the name node 300 may periodically transmit the address request packet P_AR to each of the virtual data nodes 400-1, 400-2, 400-3, 400-5, 400-6 and 400-7, or may aperiodically transmit the address request packet P_AR to each of the virtual data nodes 400-1, 400-2, 400-3, 400-5, 400-6 and 400-7.

When receiving the address request packet P_AR from the name node 300, each of the virtual data nodes 400-1, 400-2, 400-3, 400-5, 400-6 and 400-7 may transmit the address packet P_A to the name node 300 after storing its own MAC address, which is stored in the respective internal register 410, in the payload of the address packet P_A as the data node MAC address DN_MAC at operation S145.

The name node 300 may update the node configuration based on the address packet P_A received from each of the virtual data nodes 400-1, 400-2, 400-3, 400-5, 400-6 and 400-7 at operation S147.

For example, since the third data node 400-3 operates on the second physical host 100-2, the IP address of the third data node 400-3 may be stored in the configuration table CT in relation with the second MAC address P_MAC2 of the second physical host 100-2. When the third data node 400-3 migrates from the second physical host 100-2 to the fourth physical host 100-4, the source IP address S_IP included in the header of the address packet P_A received from the third data node 400-3 may correspond to the IP address of the third data node 400-3, and the source MAC address S_MAC included in the header of the address packet P_A received from the third data node 400-3 may correspond to the fourth MAC address P_MAC4 of the fourth physical host 100-4 (e.g., the source MAC address S_MAC included in the header of the address packet P_A may be updated in response to the third data node 400-3 migrating to another physical host).

Therefore, the name node 300 may update the configuration table CT such that the source IP address S_IP and the source MAC address S_MAC, which are read from the header of the address packet P_A received from each of the plurality of data nodes 400-1, 400-2, 400-3, 400-4, 400-5, 400-6 and 400-7, may be related with each other in the configuration table CT. As such, the name node 300 may update the node configuration even in a case in which the plurality of data nodes 400-1, 400-2, 400-3, 400-4, 400-5, 400-6 and 400-7 migrate between the plurality of physical hosts 100-1, 100-2, 100-3 and 100-4.

Figure 8:
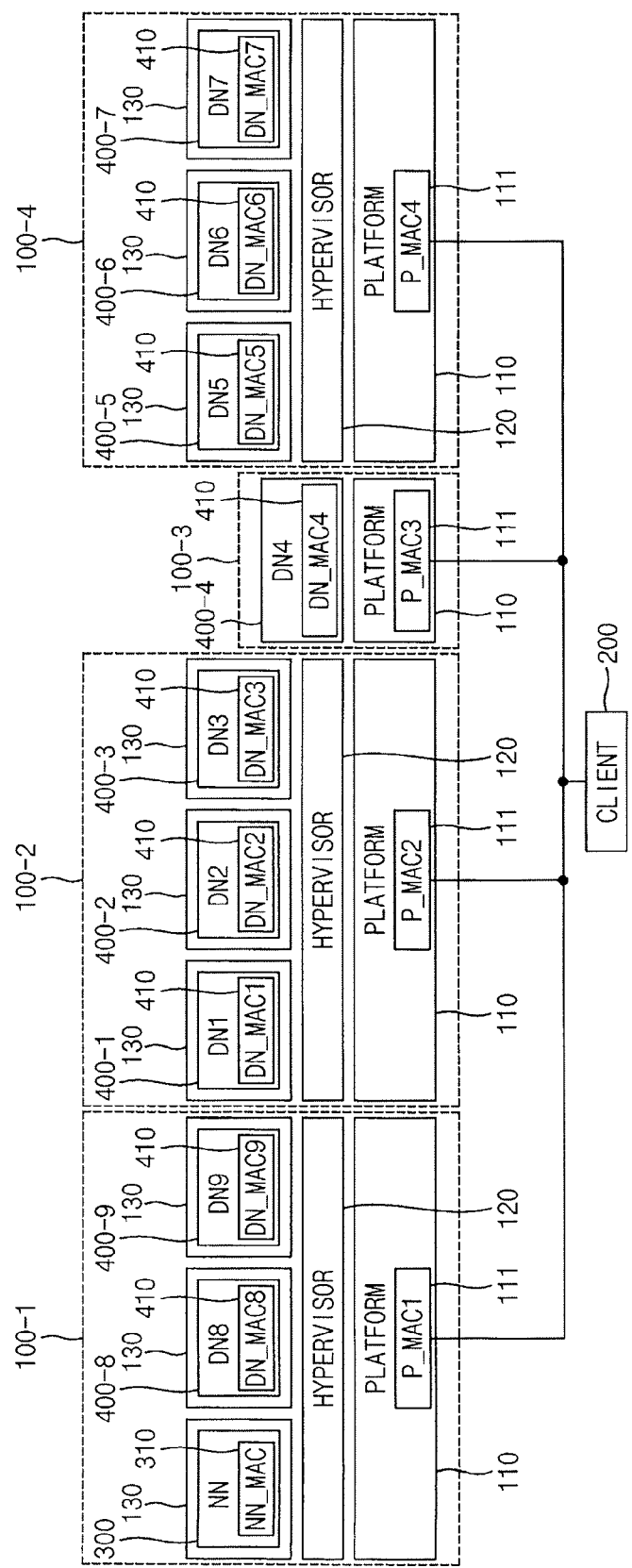
FIG. 8 is a block diagram illustrating a distributed processing system according to an exemplary embodiment of the present inventive concept.

FIG. 8 is a block diagram illustrating a distributed processing system according to an exemplary embodiment of the present inventive concept.

Referring to FIG. 8, a distributed processing system 20 includes a plurality of physical hosts 100-1, 100-2, 100-3 and 100-4 and a client terminal 200.

At least one name node NN 300 and a plurality of data nodes DN1, DN2, DN3, DN4, DN5, DN6, DN7, DN8 and DN9 400-1, 400-2, 400-3, 400-4, 400-5, 400-6, 400-7, 400-8 and 400-9 operate on the plurality of physical hosts 100-1, 100-2, 100-3 and 100-4.

The client terminal 200 provides a data processing command to the name node 300.

The distributed processing system 20 of FIG. 8 is the same as the distributed processing system 10 of FIG. 1 except that, in the distributed processing system 20 of FIG. 8, the name node 300, an eighth data node 400-8 and a ninth data node 400-9 operate on the virtual machine 130 that is driven by the hypervisor 120 on the platform 110 of the first physical host 100-1.

As illustrated in FIG. 8, the name node 300 may operate on the virtual machine 130. In this case, as will be described in further detail with reference to FIG. 9, the name node 300 may determine the node configuration including information about which data node(s) operates on a physical host on which the name node 300 operates.

Figure 9:
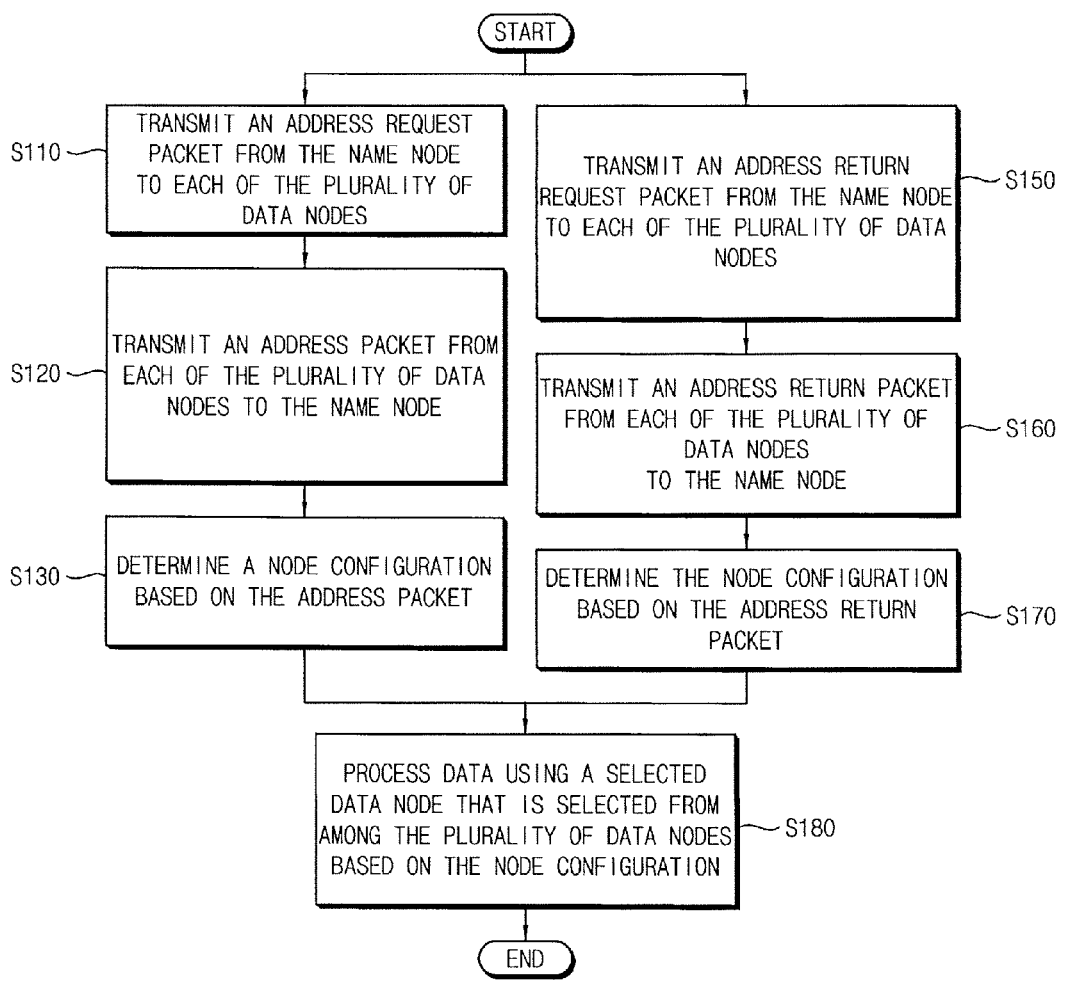
FIG. 9 is a flowchart illustrating an example of the method of operating a distributed processing system of FIG. 2 according to an exemplary embodiment of the present inventive concept.

FIG. 9 is a flowchart illustrating an example of the method of operating a distributed processing system of FIG. 2 according to an exemplary embodiment of the present inventive concept.

The method of FIG. 9 may be performed by, for example, the distributed processing system 20 of FIG. 8.

Hereinafter, an operation of the distributed processing system 20 will be described with reference to FIGS. 1 to 9.

In FIG. 9, operations S110, S120 and S130 are described above with reference to FIGS. 1 to 7.

Referring to FIG. 9, the name node 300 may transmit an address return request packet P_ARER to each of the plurality of data nodes 400-1, 400-2, 400-3, 400-4, 400-5, 400-6, 400-7, 400-8 and 400-9 after storing its own MAC address, which is stored in the internal register 310, in a payload of the address return request packet P_ARER as a name node MAC address NN_MAC at operation S150.

Figure 10:
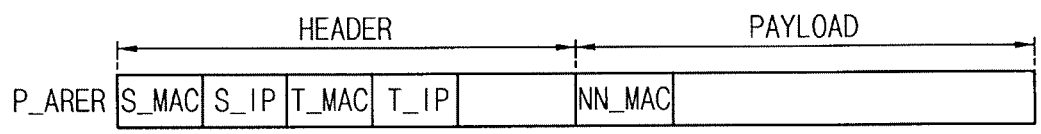
FIG. 10 is a diagram illustrating an example of an address return request packet according to an exemplary embodiment of the present inventive concept.

FIG. 10 is a diagram illustrating an example of an address return request packet according to an exemplary embodiment of the present inventive concept.

Referring to FIG. 10, the address return request packet P_ARER may include, for example, a header and a payload.

The name node 300 may read the MAC address NN_MAC stored in the internal register 310, store the read MAC address NN_MAC in the payload of the address return request packet P_ARER as the name node MAC address NN_MAC, and transmit the address return request packet P_ARER to each of the plurality of data nodes 400-1, 400-2, 400-3, 400-4, 400-5, 400-6, 400-7, 400-8 and 400-9.

In the distributed processing system 20 of FIG. 8, the first through seventh data nodes 400-1, 400-2, 400-3, 400-4, 400-5, 400-6 and 400-7 may operate on the second through fourth physical hosts 100-2, 100-3 and 100-4 that are different from the first physical host 100-1 on which the name node 300 operates. Therefore, the address return request packet P_ARER generated by the name node 300 and transmitted to the first through seventh data nodes 400-1, 400-2, 400-3, 400-4, 400-5, 400-6 and 400-7 may be provided to the platform 110 of the first physical host 100-1. The platform 110 of the first physical host 100-1 may change a source MAC address S_MAC, a source IP address S_IP, a target MAC address T_MAC, and a target IP address T_IP, which are included in the header of the address return request packet P_ARER, and may then transmit the address return request packet P_ARER to each of the first through seventh data nodes 400-1, 400-2, 400-3, 400-4, 400-5, 400-6 and 400-7. Therefore, the source MAC address S_MAC, which is included in the header of the address return request packet P_ARER transmitted to the first through seventh data nodes 400-1, 400-2, 400-3, 400-4, 400-5, 400-6 and 400-7, may correspond to the first MAC address P_MAC1 of the first physical host 100-1. Further, the source IP address S_IP, which is included in the header of the address return request packet P_ARER transmitted to the first through seventh data nodes 400-1, 400-2, 400-3, 400-4, 400-5, 400-6 and 400-7, may correspond to the IP address of the name node 300. Further, the target MAC address T_MAC, which is included in the header of the address return request packet P_ARER transmitted to the first through seventh data nodes 400-1, 400-2, 400-3, 400-4, 400-5, 400-6 and 400-7, may correspond to the MAC address of a physical host on which a destination data node receiving the address return request packet P_ARER operates. Further, the target IP address T_IP, which is included in the header of the address return request packet P_ARER transmitted to the first through seventh data nodes 400-1, 400-2, 400-3, 400-4, 400-5, 400-6 and 400-7, may correspond to the IP address of the destination data node.

In the distributed processing system 20 of FIG. 8, the eighth and ninth data nodes 400-8 and 400-9 may operate on the first physical host 100-1 on which the name node 300 operates. As a result, the address return request packet P_ARER generated by the name node 300 and transmitted to the eighth and ninth data nodes 400-8 and 400-9 may be directly transmitted from the name node 300 to the eighth and ninth data nodes 400-8 and 400-9 without changes being made to the header information at the platform 110 of the first physical host 100-1. Therefore, the source MAC address S_MAC, which is included in the header of the address return request packet P_ARER transmitted to the eighth and ninth data nodes 400-8 and 400-9, may correspond to the MAC address NN_MAC of the name node 300. Further, the source IP address S_IP, which is included in the header of the address return request packet P_ARER transmitted to the eighth and ninth data nodes 400-8 and 400-9, may correspond to the IP address of the name node 300. Further, the target MAC address T_MAC, which is included in the header of the address return request packet P_ARER transmitted to the eighth and ninth data nodes 400-8 and 400-9, may correspond to the MAC address of a destination data node receiving the address return request packet P_ARER. Further, the target IP address T_IP, which is included in the header of the address return request packet P_ARER transmitted to the eighth and ninth data nodes 400-8 and 400-9, may correspond to the IP address of the destination data node.

Referring again to FIG. 9, when receiving the address return request packet P_ARER from the name node 300, each of the plurality of data nodes 400-1, 400-2, 400-3, 400-4, 400-5, 400-6, 400-7, 400-8 and 400-9 may transmit an address return packet P_ARE to the name node 300 after storing the source MAC address S_MAC, which is included in the header of the address return request packet P_ARER, in a payload of the address return packet P_ARE as a source name node MAC address S_NN_MAC, and storing the name node MAC address NN_MAC, which is included in the payload of the address return request packet P_ARER, in the payload of the address return packet P_ARE at operation S160.

Figure 11:
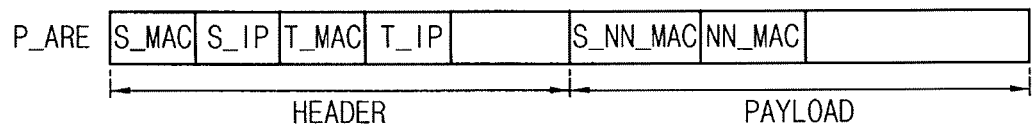
FIG. 11 is a diagram illustrating an example of an address return packet according to an exemplary embodiment of the present inventive concept.

FIG. 11 is a diagram illustrating an example of an address return packet according to an exemplary embodiment of the present inventive concept.

Referring to FIG. 11, the address return packet P_ARE may include, for example, a header and a payload.

When receiving the address return request packet P_ARER from the name node 300, each of the plurality of data nodes 400-1, 400-2, 400-3, 400-4, 400-5, 400-6, 400-7, 400-8 and 400-9 may read the source MAC address S_MAC from the header of the address return request packet P_ARER and store the source MAC address S_MAC in the payload of the address return packet P_ARE as a source name node MAC address S_NN_MAC, and may read the name node MAC address NN_MAC from the payload of the address return request packet P_ARER and store the name node MAC address NN_MAC in the payload of the address return packet P_ARE. Each of the plurality of data nodes 400-1, 400-2, 400-3, 400-4, 400-5, 400-6, 400-7, 400-8 and 400-9 may then transmit the address return packet P_ARE to the name node 300.

In the distributed processing system 20 of FIG. 8, the first through seventh data nodes 400-1, 400-2, 400-3, 400-4, 400-5, 400-6 and 400-7 may operate on the second through fourth physical hosts 100-2, 100-3 and 100-4 that are different from the first physical host 100-1 on which the name node 300 operates. Therefore, the address return packet P_ARE generated by each of the first through seventh data nodes 400-1, 400-2, 400-3, 400-4, 400-5, 400-6 and 400-7 may be provided to the respective platform 110 of the second through fourth physical hosts 100-2, 100-3 and 100-4. The platform 110 of the second through fourth physical hosts 100-2, 100-3 and 100-4 may change a source MAC address S_MAC, a source IP address S_IP, a target MAC address T_MAC, and a target IP address T_IP, which are included in the header of the address return packet P_ARE, and then may transmit the address return packet P_ARE to the name node 300. Therefore, the source MAC address S_MAC, which is included in the header of the address return packet P_ARE generated by each of the first through seventh data nodes 400-1, 400-2, 400-3, 400-4, 400-5, 400-6 and 400-7, may correspond to the MAC address of a physical host on which each of the first through seventh data nodes 400-1, 400-2, 400-3, 400-4, 400-5, 400-6 and 400-7 operates. Further, the source IP address S_IP, which is included in the header of the address return packet P_ARE generated by each of the first through seventh data nodes 400-1, 400-2, 400-3, 400-4, 400-5, 400-6 and 400-7, may correspond to the IP address of each of the first through seventh data nodes 400-1, 400-2, 400-3, 400-4, 400-5, 400-6 and 400-7. Further, the target MAC address T_MAC, which is included in the header of the address return packet P_ARE generated by each of the first through seventh data nodes 400-1, 400-2, 400-3, 400-4, 400-5, 400-6 and 400-7, may correspond to the first MAC address P_MAC1 of the first physical host 100-1 on which the name node 300 operates. Further, the target IP address T_IP, which is included in the header of the address return packet P_ARE generated by each of the first through seventh data nodes 400-1, 400-2, 400-3, 400-4, 400-5, 400-6 and 400-7, may correspond to the IP address of the name node 300.

In the distributed processing system 20 of FIG. 8, the eighth and ninth data nodes 400-8 and 400-9 may operate on the first physical host 100-1 on which the name node 300 operates. Therefore, the address return packet P_ARE generated by each of the eighth and ninth data nodes 400-8 and 400-9 may be directly transmitted from each of the eighth and ninth data nodes 400-8 and 400-9 to the name node 300 without changes being made to the header information at the platform 110 of the first physical host 100-1. Therefore, the source MAC address S_MAC, which is included in the header of the address return packet P_ARE generated by each of the eighth and ninth data nodes 400-8 and 400-9, may correspond to the MAC address of each of the eighth and ninth data nodes 400-8 and 400-9. Further, the source IP address S_IP, which is included in the header of the address return packet P_ARE generated by each of the eighth and ninth data nodes 400-8 and 400-9, may correspond to the IP address of each of the eighth and ninth data nodes 400-8 and 400-9. Further, the target MAC address T_MAC, which is included in the header of the address return packet P_ARE generated by each of the eighth and ninth data nodes 400-8 and 400-9, may correspond to the MAC address NN_MAC of the name node 300. Further, the target IP address T_IP, which is included in the header of the address return packet P_ARE generated by each of the eighth and ninth data nodes 400-8 and 400-9, may correspond to the IP address of the name node 300.

Referring again to FIG. 9, the name node 300 may determine the node configuration, which represents connection information between the name node 300 and the plurality of data nodes 400-1, 400-2, 400-3, 400-4, 400-5, 400-6, 400-7, 400-8 and 400-9 included in the distributed processing system 20, based on the address return packet P_ARE received from each of the plurality of data nodes 400-1, 400-2, 400-3, 400-4, 400-5, 400-6, 400-7, 400-8 and 400-9 at operation S170.

For example, the node configuration may indicate whether the name node 300 operates on the virtual machine 130, and may indicate which data node(s) from among the plurality of data nodes 400-1, 400-2, 400-3, 400-4, 400-5, 400-6, 400-7, 400-8 and 400-9 operates on a same physical host as the name node 300.

In exemplary embodiments, the name node 300 may determine the node configuration based on the source name node MAC address S_NN_MAC and the name node MAC address NN_MAC included in the payload of the address return packet P_ARE.

Figure 12:
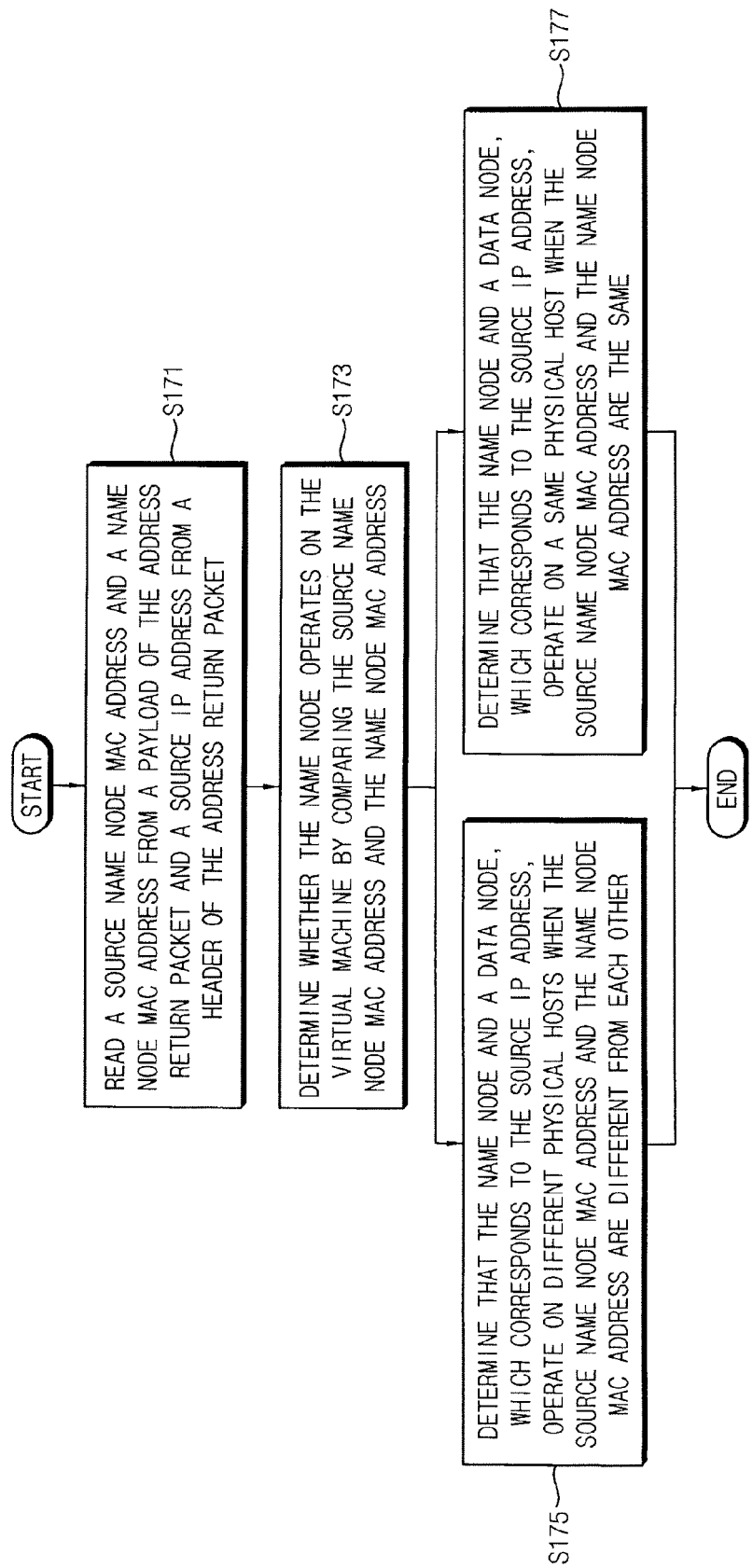
FIG. 12 is a flowchart illustrating an example of determining the node configuration based on an address return packet of FIG. 9 according to an exemplary embodiment of the present inventive concept.

FIG. 12 is a flowchart illustrating an example of determining the node configuration based on an address return packet of FIG. 9 according to an exemplary embodiment of the present inventive concept.

Referring to FIG. 12, the name node 300 may read the source name node MAC address S_NN_MAC and the name node MAC address NN_MAC from the payload of the address return packet P_ARE, and may read the IP address from the header of the address return packet P_ARE at operation S171. The name node 300 may determine whether the name node 300 operates on the virtual machine 130 by comparing the source name node MAC address S_NN_MAC and the name node MAC address NN_MAC at operation S173.

As described above with reference to FIG. 8, when the name node 300 operates on the virtual machine 130, the MAC address NN_MAC stored in the internal register 310 of the name node 300 may be different from the MAC address of the first physical host 100-1 on which the name node 300 operates.

The source MAC address S_MAC, which is included in the header of the address return request packet P_ARER received by each of the first through seventh data nodes 400-1, 400-2, 400-3, 400-4, 400-5, 400-6 and 400-7, and the name node MAC address NN_MAC, which is included in the payload of the address return request packet P_ARER received by each of the first through seventh data nodes 400-1, 400-2, 400-3, 400-4, 400-5, 400-6 and 400-7, may be different from each other. Thus, the source name node MAC address S_NN_MAC and the name node MAC address NN_MAC, which is included in the payload of the address return packet P_ARE received by the name node 300 from each of the first through seventh data nodes 400-1, 400-2, 400-3, 400-4, 400-5, 400-6 and 400-7, may be different from each other.

The source MAC address S_MAC, which is included in the header of the address return request packet P_ARER received by each of the eighth and ninth data nodes 400-8 and 400-9, and the name node MAC address NN_MAC, which is included in the payload of the address return request packet P_ARER received by each of the eighth and ninth data nodes 400-8 and 400-9, may be the same. Thus, the source name node MAC address S_NN_MAC and the name node MAC address NN_MAC, which is included in the payload of the address return packet P_ARE received by the name node 300 from each of the eighth and ninth data nodes 400-8 and 400-9, may be the same.

Therefore, the name node 300 may determine that the name node 300 operates on the virtual machine 130 when the source name node MAC address S_NN_MAC and the name node MAC address NN_MAC are different from each other in at least one of the address return packets P_ARE received from the plurality of data nodes 400-1, 400-2, 400-3, 400-4, 400-5, 400-6, 400-7, 400-8 and 400-9.

In addition, the name node 300 may determine that the name node 300 and a data node, which corresponds to the source IP address S_IP included in the header of the address return packet P_ARE, operate on different physical hosts when the source name node MAC address S_NN_MAC and the name node MAC address NN_MAC are different from each other in the address return packet P_ARE at operation S175. Alternatively, the name node 300 may determine that the name node 300 and a data node, which corresponds to the source IP address S_IP included in the header of the address return packet P_ARE, operate on a same physical host when the source name node MAC address S_NN_MAC and the name node MAC address NN_MAC are the same in the address return packet P_ARE at operation S177.

As illustrated in FIG. 9, according to exemplary embodiments, a series of the operations S110, S120 and S130, and a series of the operations S150, S160 and S170 may be performed in parallel independently.

Therefore, in exemplary embodiments, the name node 300 may determine the node configuration of the distributed processing system 20 based on both the address packet P_A and the address return packet P_ARE received from each of the plurality of data nodes 400-1, 400-2, 400-3, 400-4, 400-5, 400-6, 400-7, 400-8 and 400-9.

In exemplary embodiments, the name node 300 may generate the node configuration, which represents whether the name node 300 and each of the plurality of data nodes 400-1, 400-2, 400-3, 400-4, 400-5, 400-6, 400-7, 400-8 and 400-9 operates on the virtual machine 130, and represents on which physical host the name node 300 and each of the plurality of data nodes 400-1, 400-2, 400-3, 400-4, 400-5, 400-6, 400-7, 400-8 and 400-9 operates, as a configuration table CT. According to exemplary embodiments, the name node 300 may store the configuration table CT in a volatile memory device such as, for example, a dynamic random access memory (DRAM) device, or in a nonvolatile memory device such as, for example, a flash memory device.

FIG. 13 is a diagram illustrating an example of a configuration table generated by a name node according to an exemplary embodiment of the present inventive concept.

Referring to FIG. 13, the configuration table CT may include, for example, a node field, a physical host field and a virtual machine field.

As illustrated in FIG. 13, the name node 300 may store the IP address of the name node 300 and each of the plurality of data nodes 400-1, 400-2, 400-3, 400-4, 400-5, 400-6, 400-7, 400-8 and 400-9, the MAC address of a physical host on which the name node 300 and each of the plurality of data nodes 400-1, 400-2, 400-3, 400-4, 400-5, 400-6, 400-7, 400-8 and 400-9 operates, and information indicating whether the name node 300 and each of the plurality of data nodes 400-1, 400-2, 400-3, 400-4, 400-5, 400-6, 400-7, 400-8 and 400-9 operates in the virtual machine 130 in the node field, the physical host field and the virtual machine field, respectively.

As a result, the name node 300 may determine which nodes operate on a same physical host, and which nodes operate on different physical hosts based on the configuration table CT.

As described above, at least one node from among the name node 300 and the plurality of data nodes 400-1, 400-2, 400-3, 400-4, 400-5, 400-6, 400-7, 400-8 and 400-9 may operate on the virtual machine 130.

The virtual machine 130 operating on the plurality of physical hosts 100-1, 100-2, 100-3 and 100-4 may migrate between the plurality of physical hosts 100-1, 100-2, 100-3 and 100-4 while turning on without stopping an operation. When the virtual machine 130 migrates between the plurality of physical hosts 100-1, 100-2, 100-3 and 100-4, a node operating on the virtual machine 130 may also be migrated with the virtual machine 130, and the node configuration may accordingly be changed.

In exemplary embodiments, the series of the operations S150, S160 and S170 may be performed repeatedly. According to exemplary embodiments, the series of the operations S150, S160 and S170 may be performed periodically or aperiodically.

Therefore, the name node 300 may update the node configuration periodically or aperiodically to update the configuration table CT. As a result, the distributed processing system 20 may continuously operate without a reboot even in a case in which the plurality of data nodes 400-1, 400-2, 400-3, 400-4, 400-5, 400-6, 400-7, 400-8 and 400-9 migrate between the plurality of physical hosts 100-1, 100-2, 100-3 and 100-4.

Referring again to FIG. 9, the name node 300 processes data using a selected data node that is selected from among the plurality of data nodes 400-1, 400-2, 400-3, 400-4, 400-5, 400-6, 400-7, 400-8 and 400-9 based on the node configuration at operation S180.

Figure 14:
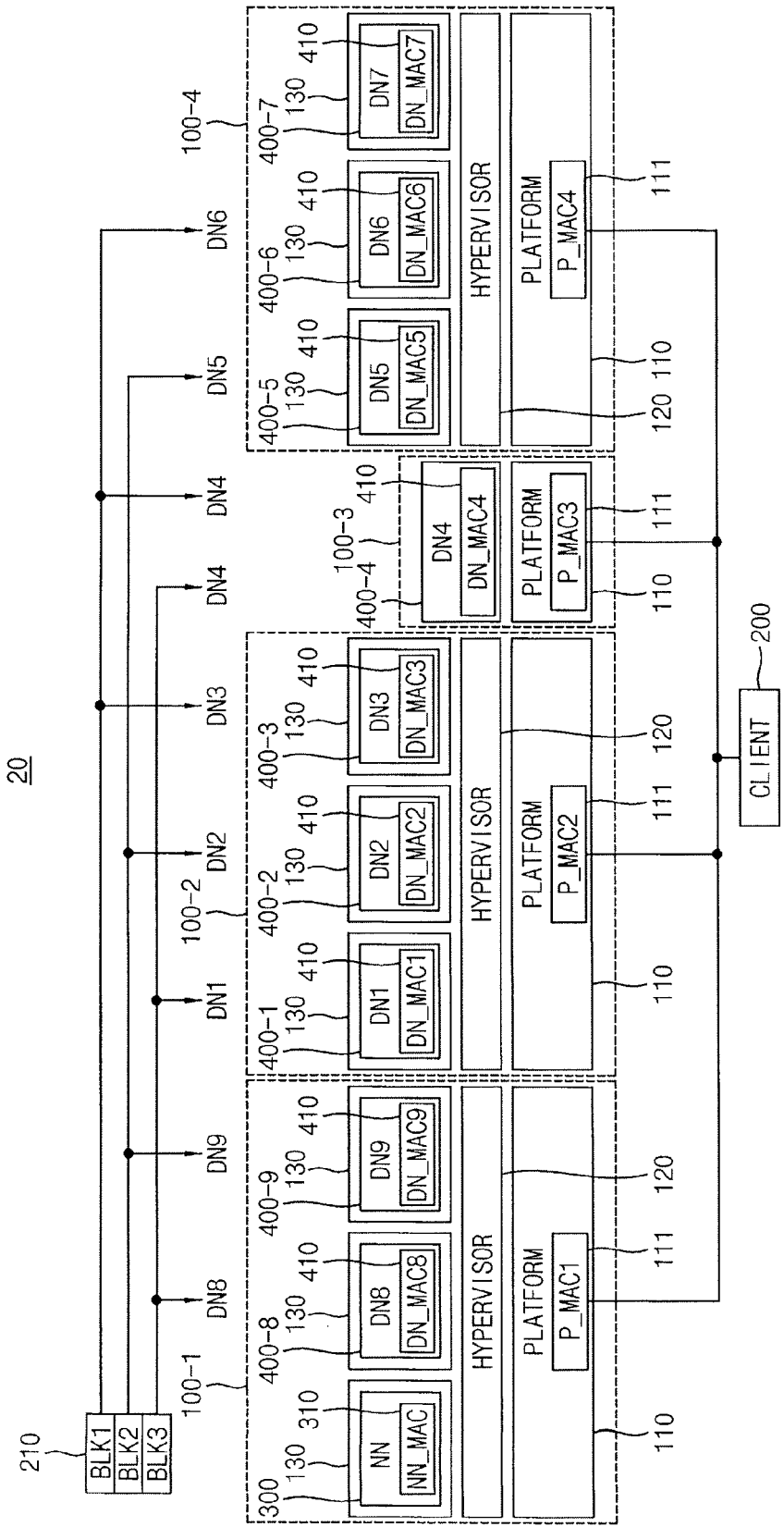
FIGS. 14, 15 and 16 are diagrams illustrating examples of processing data using a selected data node that is selected from among a plurality of data nodes based on the node configuration of FIG. 8 according to an exemplary embodiment of the present inventive concept.
Figure 15:
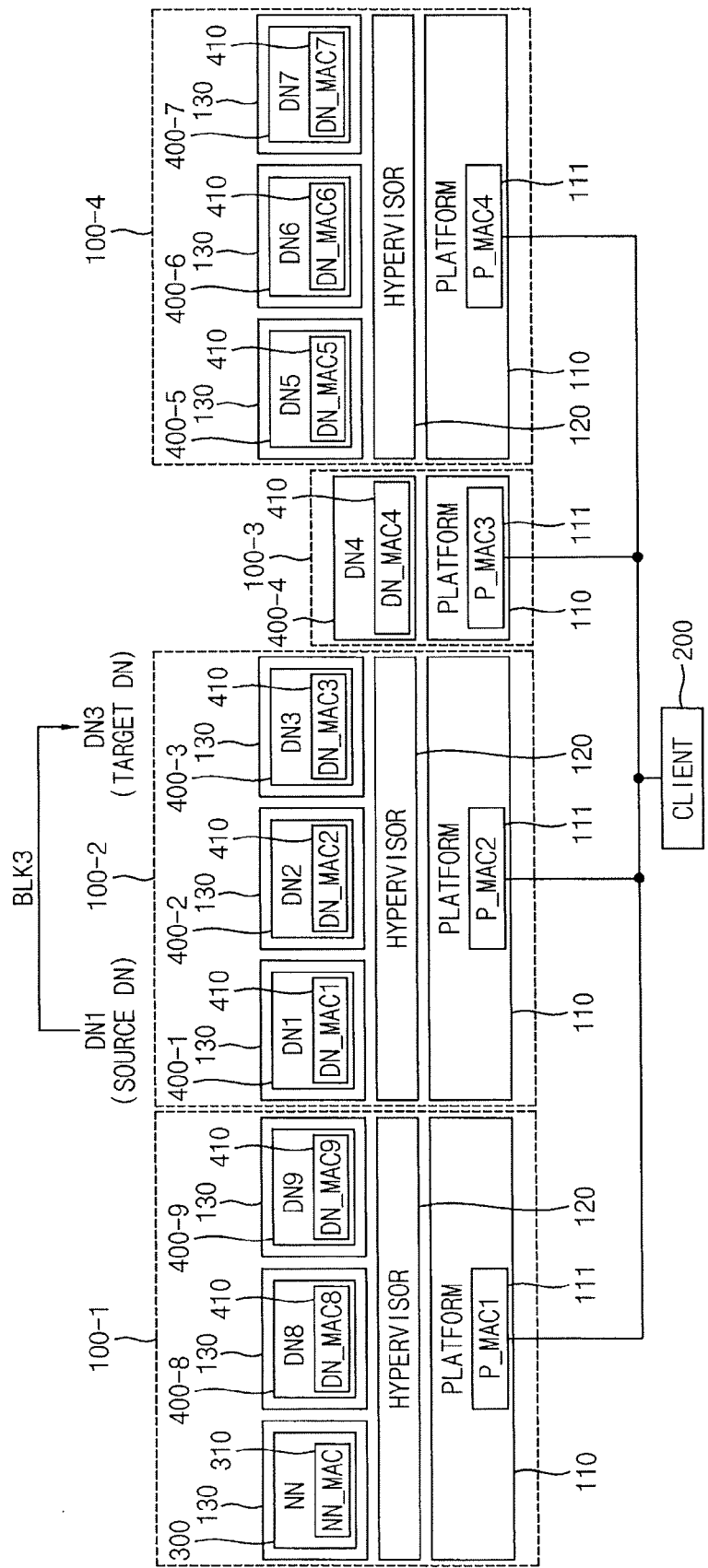
Figure 16:
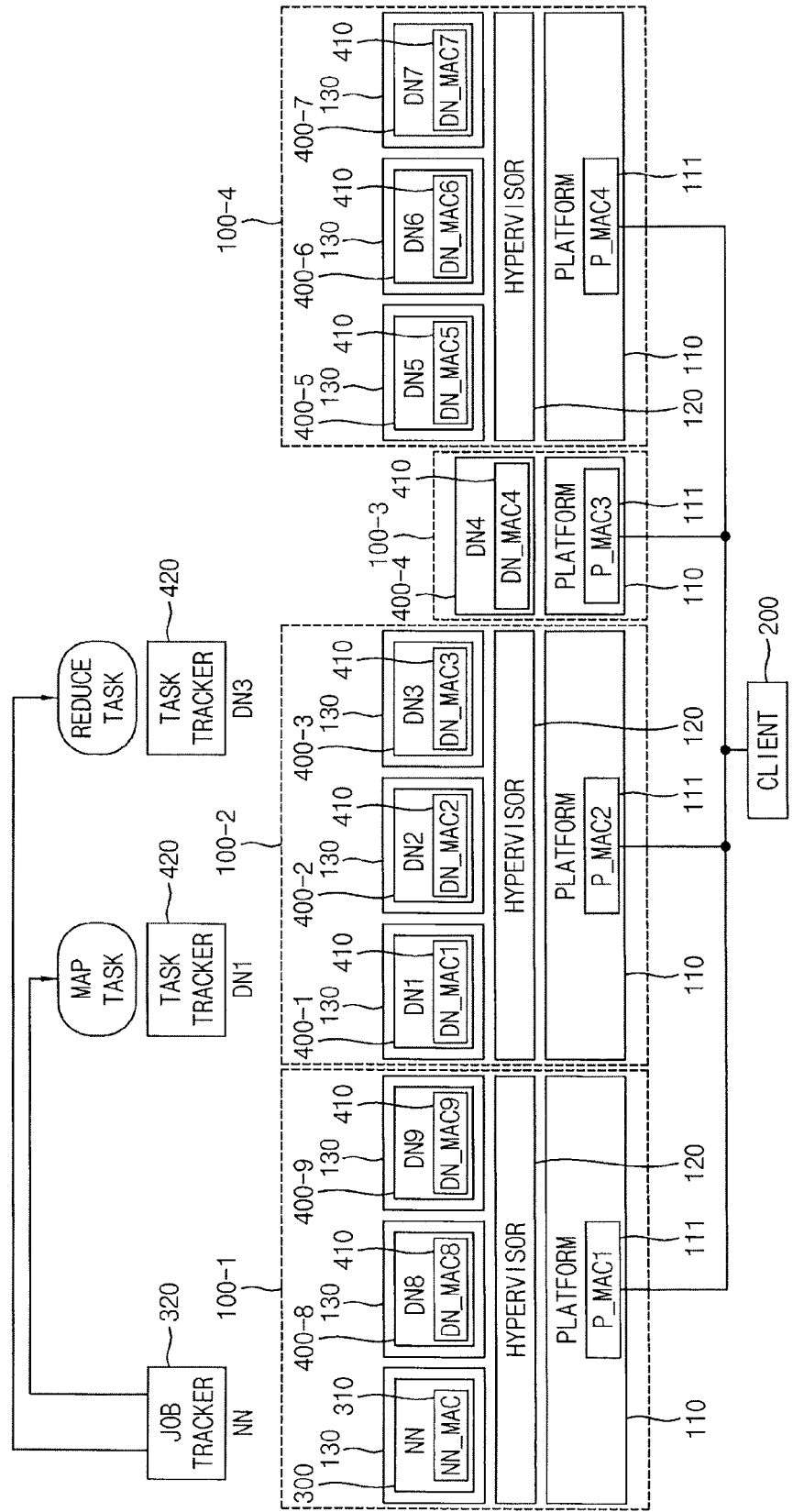

FIGS. 14, 15 and 16 are diagrams illustrating examples of processing data using a selected data node that is selected from among a plurality of data nodes based on the node configuration of FIG. 8 according to exemplary embodiments of the present inventive concept.

Referring to FIG. 14, when the name node 300 receives a write command and write data 210 from the client terminal 200, the name node 300 may select at least two data nodes operating on different physical hosts from among the plurality of data nodes 400-1, 400-2, 400-3, 400-4, 400-5, 400-6, 400-7, 400-8 and 400-9 based on the node configuration, and may store a copy of the write data 210 in the selected at least two data nodes.

For example, as illustrated in FIG. 14, the name node 300 may divide the write data 210 into a plurality of blocks BLK1, BLK2 and BLK3, and distribute the plurality of blocks BLK1, BLK2 and BLK3 to the plurality of data nodes 400-1, 400-2, 400-3, 400-4, 400-5, 400-6, 400-7, 400-8 and 400-9. For example, the name node 300 may select the third, fourth and sixth data nodes 400-3, 400-4 and 400-6, which operate on different physical hosts, based on the configuration table CT representing the node configuration, and may store a copy of the first block BLK1 in each of the third, fourth and sixth data nodes 400-3, 400-4 and 400-6. The name node 300 may select the second, fifth and ninth data nodes 400-2, 400-5 and 400-9, which operate on different physical hosts, based on the configuration table CT representing the node configuration, and may store a copy of the second block BLK2 in each of the second, fifth and ninth data nodes 400-2, 400-5 and 400-9. The name node 300 may select the first, fourth and eighth data nodes 400-1, 400-4 and 400-8, which operate on different physical hosts, based on the configuration table CT representing the node configuration, and may store a copy of the third block BLK3 in each of the first, fourth and eighth data nodes 400-1, 400-4 and 400-8.

As described above with reference to FIG. 14, the name node 300 may determine a copy placement policy of a HADOOP framework based on the node configuration. Since the name node 300 stores a copy of each of the plurality of blocks BLK1, BLK2 and BLK3 in at least two data nodes operating on different physical hosts from each other, the distributed processing system 20 may operate stably even in a case in which some of the plurality of physical hosts 100-1, 100-2, 100-3 and 100-4 stop operating.

Referring to FIG. 15, the name node 300 may select a data node that stores a relatively large amount of data from among the plurality of data nodes 400-1, 400-2, 400-3, 400-4, 400-5, 400-6, 400-7, 400-8 and 400-9 as a source data node. For example, a data node that stores a relatively large amount of data compared to the other data nodes may be selected as a source data node. The name node 300 may select a data node(s) operating on a same physical host as the source data node from among the plurality of data nodes 400-1, 400-2, 400-3, 400-4, 400-5, 400-6, 400-7, 400-8 and 400-9 as a target data node(s) based on the node configuration. The name node 300 may move a portion of data stored in the source data node to a data node storing a relatively small amount of data from among the target data nodes. For example, the name node 300 may move a portion of data stored in the source data node to a data node that stores a relatively small amount of data compared to the other data nodes.

For example, as illustrated in FIG. 15, if the first data node 400-1 stores the largest amount of data from among the plurality of data nodes 400-1, 400-2, 400-3, 400-4, 400-5, 400-6, 400-7, 400-8 and 400-9, the name node 300 may select the first data node 400-1 as the source data node, and may select the second and third data nodes 400-2 and 400-3, which operate on the second physical host 100-2 on which the source data node operates, as the target data nodes based on the node configuration. If the third data node 400-3 stores less data than the second data node 400-2, the name node 300 may move a portion of data stored in the source data node, which corresponds to the first data node 400-1, to the third data node 400-3.

As described above with reference to FIG. 15, the name node 300 may determine a balancer policy of a HADOOP framework based on the node configuration. Since the name node 300 moves a portion of data from the source data node, which stores a relatively large amount of data, to one of the target data nodes operating on a same physical host as the source data node, the distributed processing system 20 may increase a speed of balancing data between the plurality of data nodes 400-1, 400-2, 400-3, 400-4, 400-5, 400-6, 400-7, 400-8 and 400-9.

Referring to FIG. 16, when the name node 300 receives a job command from the client terminal 200, the name node 300 may select at least two data nodes operating on a same physical host from among the plurality of data nodes 400-1, 400-2, 400-3, 400-4, 400-5, 400-6, 400-7, 400-8 and 400-9 based on the node configuration, and allocate a map task and a reduce task to the selected at least two data nodes.

For example, as illustrated in FIG. 16, when the name node 300 receives the job command from the client terminal 200 to perform a job, a job tracker 320 operating on the name node 300 may divide the job into at least one map task and at least one reduce task, select data nodes (e.g., the first and third data nodes 400-1 and 400-3) operating on a same physical host from among the plurality of data nodes 400-1, 400-2, 400-3, 400-4, 400-5, 400-6, 400-7, 400-8 and 400-9 based on the node configuration, and allocate the at least one map task and the at least one reduce task to the first and third data nodes 400-1 and 400-3, respectively. A task tracker 420 operating on the first data node 400-1 may perform the allocated map task and transmit result data to the third data node 400-3. A task tracker 420 operating on the third data node 400-3 may perform the allocated reduce task on the result data received from the first data node 400-1.

As described above with reference to FIG. 16, the name node 300 may determine a task scheduling policy of a HADOOP framework based on the node configuration. Since the name node 300 allocates the map task and the reduce task to data nodes operating on a same physical host, a data transmission speed between the data nodes may be increased. As a result, the distributed processing system 20 may increase a speed of processing data using a MapReduce framework.

As described above with reference to FIGS. 1 to 16, the name node 300 may operate as a master server controlling overall operations of the distributed processing system 20. The name node 300 may update the node configuration periodically or aperiodically even in a case in which at least one node from among the name node 300 and the plurality of data nodes 400-1, 400-2, 400-3, 400-4, 400-5, 400-6, 400-7, 400-8 and 400-9 migrates between the plurality of physical hosts 100-1, 100-2, 100-3 and 100-4. Therefore, the name node 300 may effectively control the distributed processing system 20 to perform data processing without a reboot regardless of a migration of the name node 300 and the plurality of data nodes 400-1, 400-2, 400-3, 400-4, 400-5, 400-6, 400-7, 400-8 and 400-9. As a result, performance of the distributed processing system 20 may be improved.

Figure 17:
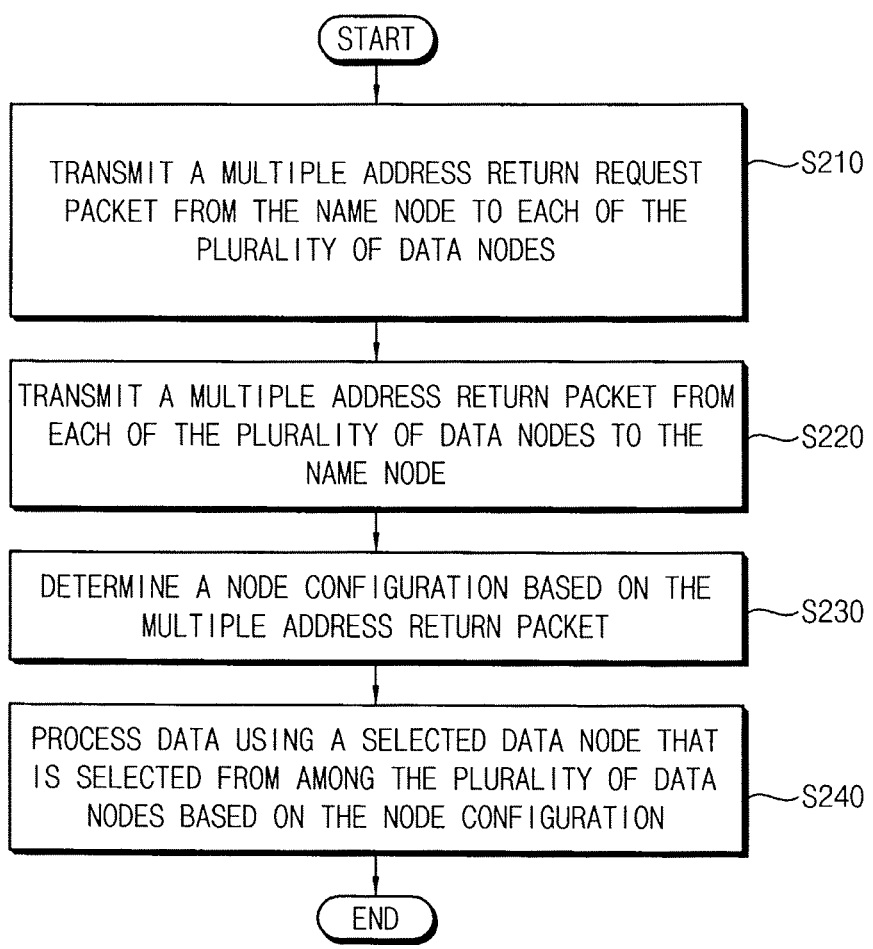
FIG. 17 is a flowchart illustrating a method of operating a distributed processing system according to an exemplary embodiment of the present inventive concept.

FIG. 17 is a flowchart illustrating a method of operating a distributed processing system according to an exemplary embodiment of the present inventive concept.

The method described with reference to FIG. 17 may be performed, for example, by the distributed processing system 20 of FIG. 8.

Referring to the exemplary embodiment described with reference to FIG. 9, the name node 300 and the plurality of data nodes 400-1, 400-2, 400-3, 400-4, 400-5, 400-6, 400-7, 400-8 and 400-9 use the address request packet P_AR, the address packet P_A, the address return request packet P_ARER, and the address return packet P_ARE to communicate with each other. Referring to the exemplary embodiment described with reference to FIG. 17, the address request packet P_AR and the address return request packet P_ARER are merged into a multiple address return request packet P_MARER, and the address packet P_A and the address return packet P_ARE are merged into a multiple address return packet P_MARE. The name node 300 and the plurality of data nodes 400-1, 400-2, 400-3, 400-4, 400-5, 400-6, 400-7, 400-8 and 400-9 use the multiple address return request packet P_MARER and the multiple address return packet P_MARE to communicate with each other.

Hereinafter, an operation of the distributed processing system 20 will be described with reference to FIGS. 1 to 17.

Referring to FIG. 17, the name node 300 may transmit a multiple address return request packet P_MARER to each of the plurality of data nodes 400-1, 400-2, 400-3, 400-4, 400-5, 400-6, 400-7, 400-8 and 400-9 after storing its own MAC address, which is stored in the internal register 310, in a payload of the multiple address return request packet P_MARER as a name node MAC address NN_MAC at operation S210.

Figure 18:
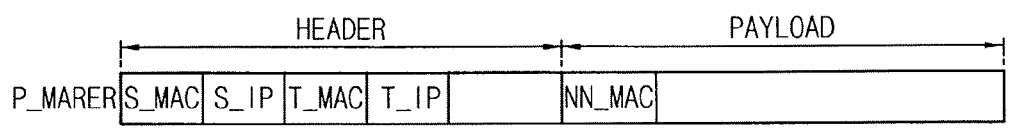
FIG. 18 is a diagram illustrating an example of a multiple address return request packet according to an exemplary embodiment of the present inventive concept.

FIG. 18 is a diagram illustrating an example of a multiple address return request packet according to an exemplary embodiment of the present invention.

Referring to FIG. 18, the multiple address return request packet P_MARER may include, for example, a header and a payload.

The name node 300 may read the MAC address NN_MAC stored in the internal register 310, store the read MAC address NN_MAC in the payload of the multiple address return request packet P_MARER as the name node MAC address NN_MAC, and transmit the multiple address return request packet P_MARER to each of the plurality of data nodes 400-1, 400-2, 400-3, 400-4, 400-5, 400-6, 400-7, 400-8 and 400-9.

In the distributed processing system 20 of FIG. 8, the first through seventh data nodes 400-1, 400-2, 400-3, 400-4, 400-5, 400-6 and 400-7 may operate on the second through fourth physical hosts 100-2, 100-3 and 100-4 that are different from the first physical host 100-1 on which the name node 300 operates. Therefore, the multiple address return request packet P_MARER generated by the name node 300 and transmitted to the first through seventh data nodes 400-1, 400-2, 400-3, 400-4, 400-5, 400-6 and 400-7 may be provided to the platform 110 of the first physical host 100-1. The platform 110 of the first physical host 100-1 may change a source MAC address S_MAC, a source IP address S_IP, a target MAC address T_MAC, and a target IP address T_IP, which are included in the header of the multiple address return request packet P_MARER, and then may transmit the multiple address return request packet P_MARER to each of the first through seventh data nodes 400-1, 400-2, 400-3, 400-4, 400-5, 400-6 and 400-7. Therefore, the source MAC address S_MAC, which is included in the header of the multiple address return request packet P_MARER transmitted to the first through seventh data nodes 400-1, 400-2, 400-3, 400-4, 400-5, 400-6 and 400-7, may correspond to the first MAC address P_MAC1 of the first physical host 100-1. Further, the source IP address S_IP, which is included in the header of the multiple address return request packet P_MARER transmitted to the first through seventh data nodes 400-1, 400-2, 400-3, 400-4, 400-5, 400-6 and 400-7, may correspond to the IP address of the name node 300. Further, the target MAC address T_MAC, which is included in the header of the multiple address return request packet P_MARER transmitted to the first through seventh data nodes 400-1, 400-2, 400-3, 400-4, 400-5, 400-6 and 400-7, may correspond to the MAC address of a physical host on which a destination data node receiving the multiple address return request packet P_MARER operates. Further, the target IP address T_IP, which is included in the header of the multiple address return request packet P_MARER transmitted to the first through seventh data nodes 400-1, 400-2, 400-3, 400-4, 400-5, 400-6 and 400-7, may correspond to the IP address of the destination data node.

In the distributed processing system 20 of FIG. 8, the eighth and ninth data nodes 400-8 and 400-9 may operate on the first physical host 100-1 on which the name node 300 operates. Therefore, the multiple address return request packet P_MARER generated by the name node 300 and transmitted to the eighth and ninth data nodes 400-8 and 400-9 may be directly transmitted from the name node 300 to the eighth and ninth data nodes 400-8 and 400-9 without changes being made to the header information at the platform 110 of the first physical host 100-1. Therefore, the source MAC address S_MAC, which is included in the header of the multiple address return request packet P_MARER transmitted to the eighth and ninth data nodes 400-8 and 400-9, may correspond to the MAC address NN_MAC of the name node 300. Further, the source IP address S_IP, which is included in the header of the multiple address return request packet P_MARER transmitted to the eighth and ninth data nodes 400-8 and 400-9, may correspond to the IP address of the name node 300. Further, the target MAC address T_MAC, which is included in the header of the multiple address return request packet P_MARER transmitted to the eighth and ninth data nodes 400-8 and 400-9, may correspond to the MAC address of a destination data node receiving the multiple address return request packet P_MARER. Further, the target IP address T_IP, which is included in the header of the multiple address return request packet P_MARER transmitted to the eighth and ninth data nodes 400-8 and 400-9, may correspond to the IP address of the destination data node.

Referring again to FIG. 17, when receiving the multiple address return request packet P_MARER from the name node 300, each of the plurality of data nodes 400-1, 400-2, 400-3, 400-4, 400-5, 400-6, 400-7, 400-8 and 400-9 may transmit the multiple address return packet P_MARE to the name node 300 after storing the source MAC address S_MAC, which is included in the header of the multiple address return request packet P_MARER, in a payload of the multiple address return packet P_MARE as a source name node MAC address S_NN_MAC, as well as storing the name node MAC address NN_MAC, which is included in the payload of the multiple address return request packet P_MARER, in the payload of the multiple address return packet P_MARE, as well as storing its own MAC address, which is stored in the respective internal register 410, in the payload of the multiple address return packet P_MARE as a data node MAC address DN_MAC at operation S220.

Figure 19:
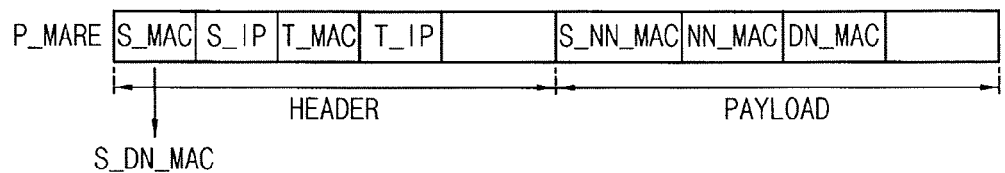
FIG. 19 is a diagram illustrating an example of a multiple address return packet according to an exemplary embodiment of the present inventive concept.

FIG. 19 is a diagram illustrating an example of a multiple address return packet according to an exemplary embodiment of the present inventive concept.

Referring to FIG. 19, the multiple address return packet P_MARE may include, for example, a header and a payload.

When receiving the multiple address return request packet P_MARER from the name node 300, each of the plurality of data nodes 400-1, 400-2, 400-3, 400-4, 400-5, 400-6, 400-7, 400-8 and 400-9 may read the source MAC address S_MAC from the header of the multiple address return request packet P_MARER and store the source MAC address S_MAC in the payload of the multiple address return packet P_MARE as a source name node MAC address S_NN_MAC, as well as read the name node MAC address NN_MAC from the payload of the multiple address return request packet P_MARER and store the name node MAC address NN_MAC in the payload of the multiple address return packet P_MARE, as well as read its own MAC address from the respective internal register 410 and store its own MAC address in the payload of the multiple address return packet P_MARE as the data node MAC address DN_MAC. Each of the plurality of data nodes 400-1, 400-2, 400-3, 400-4, 400-5, 400-6, 400-7, 400-8 and 400-9 may then transmit the multiple address return packet P_MARE to the name node 300.

In the distributed processing system 20 of FIG. 8, the first through seventh data nodes 400-1, 400-2, 400-3, 400-4, 400-5, 400-6 and 400-7 may operate on the second through fourth physical hosts 100-2, 100-3 and 100-4 that are different from the first physical host 100-1 on which the name node 300 operates. Therefore, the multiple address return packet P_MARE generated by each of the first through seventh data nodes 400-1, 400-2, 400-3, 400-4, 400-5, 400-6 and 400-7 may be provided to the respective platform 110 of the second through fourth physical hosts 100-2, 100-3 and 100-4. The platform 110 of the second through fourth physical hosts 100-2, 100-3 and 100-4 may change a source MAC address S_MAC, a source IP address S_IP, a target MAC address T_MAC, and a target IP address T_IP, which are included in the header of the multiple address return packet P_MARE, and then transmit the multiple address return packet P_MARE to the name node 300. Therefore, the source MAC address S_MAC, which is included in the header of the multiple address return packet P_MARE generated by each of the first through seventh data nodes 400-1, 400-2, 400-3, 400-4, 400-5, 400-6 and 400-7, may correspond to the MAC address of a physical host on which each of the first through seventh data nodes 400-1, 400-2, 400-3, 400-4, 400-5, 400-6 and 400-7 operates. Further, the source IP address S_IP, which is included in the header of the multiple address return packet P_MARE generated by each of the first through seventh data nodes 400-1, 400-2, 400-3, 400-4, 400-5, 400-6 and 400-7, may correspond to the IP address of each of the first through seventh data nodes 400-1, 400-2, 400-3, 400-4, 400-5, 400-6 and 400-7. Further, the target MAC address T_MAC, which is included in the header of the multiple address return packet P_MARE generated by each of the first through seventh data nodes 400-1, 400-2, 400-3, 400-4, 400-5, 400-6 and 400-7, may correspond to the first MAC address P_MAC1 of the first physical host 100-1 on which the name node 300 operates. Further, the target IP address T_IP, which is included in the header of the multiple address return packet P_MARE generated by each of the first through seventh data nodes 400-1, 400-2, 400-3, 400-4, 400-5, 400-6 and 400-7, may correspond to the IP address of the name node 300.

In the distributed processing system 20 of FIG. 8, the eighth and ninth data nodes 400-8 and 400-9 may operate on the first physical host 100-1 on which the name node 300 operates. Therefore, the multiple address return packet P_MARE generated by each of the eighth and ninth data nodes 400-8 and 400-9 may be directly transmitted from each of the eighth and ninth data nodes 400-8 and 400-9 to the name node 300 without changes being made to the header information at the platform 110 of the first physical host 100-1. Therefore, the source MAC address S_MAC, which is included in the header of the multiple address return packet P_MARE generated by each of the eighth and ninth data nodes 400-8 and 400-9, may correspond to the MAC address of each of the eighth and ninth data nodes 400-8 and 400-9. Further, the source IP address S_IP, which is included in the header of the multiple address return packet P_MARE generated by each of the eighth and ninth data nodes 400-8 and 400-9, may correspond to the IP address of each of the eighth and ninth data nodes 400-8 and 400-9. Further, the target MAC address T_MAC, which is included in the header of the multiple address return packet P_MARE generated by each of the eighth and ninth data nodes 400-8 and 400-9, may correspond to the MAC address NN_MAC of the name node 300. Further, the target IP address T_IP, which is included in the header of the multiple address return packet P_MARE generated by each of the eighth and ninth data nodes 400-8 and 400-9, may correspond to the IP address of the name node 300.

Referring again to FIG. 17, the name node 300 may determine the node configuration, which represents connection information between the name node 300 and the plurality of data nodes 400-1, 400-2, 400-3, 400-4, 400-5, 400-6, 400-7, 400-8 and 400-9 included in the distributed processing system 20, based on the multiple address return packet P_MARE received from each of the plurality of data nodes 400-1, 400-2, 400-3, 400-4, 400-5, 400-6, 400-7, 400-8 and 400-9 at operation S230.

FIG. 20 is a flowchart illustrating an example of determining the node configuration based on a multiple address return packet of FIG. 19 according to an exemplary embodiment of the present inventive concept.

Referring to FIG. 20, the name node 300 may read the source name node MAC address S_NN_MAC, the name node MAC address NN_MAC, and the data node MAC address DN_MAC from the payload of the multiple address return packet P_MARE, read the IP address from the header of the multiple address return packet P_MARE, and read the source MAC address S_MAC from the header of the multiple address return packet P_MARE as a source data node MAC address S_DN_MAC at operation S231.

The name node 300 may determine whether the name node 300 operates on the virtual machine 130 by comparing the source name node MAC address S_NN_MAC and the name node MAC address NN_MAC at operation S233.

The process of determining whether the name node 300 operates on the virtual machine 130 by comparing the source name node MAC address S_NN_MAC and the name node MAC address NN_MAC at operation S233 in FIG. 20 may be the same as the process of determining whether the name node 300 operates on the virtual machine 130 by comparing the source name node MAC address S_NN_MAC and the name node MAC address NN_MAC at operation S173 in FIG. 12.

Therefore, the name node 300 may determine that the name node 300 operates on the virtual machine 130 when the source name node MAC address S_NN_MAC and the name node MAC address NN_MAC are different from each other in at least one of the multiple address return packets P_MARE received from the plurality of data nodes 400-1, 400-2, 400-3, 400-4, 400-5, 400-6, 400-7, 400-8 and 400-9.

In addition, the name node 300 may determine whether a data node corresponding to the source IP address S_IP operates on the virtual machine 130 by comparing the source data node MAC address S_DN_MAC and the data node MAC address DN_MAC at operation S235.

The process of determining whether the data node corresponding to the source IP address S_IP operates on the virtual machine 130 by comparing the source data node MAC address S_DN_MAC and the data node MAC address DN_MAC at operation S235 in FIG. 20 may be the same as the process of determining whether the data node corresponding to the source IP address S_IP operates on the virtual machine 130 by comparing the source MAC address S_MAC and the data node MAC address DN_MAC at operation S133 in FIG. 5.

Therefore, the name node 300 may determine that the data node corresponding to the source IP address S_IP operates on the virtual machine 130 when the source data node MAC address S_DN_MAC and the data node MAC address DN_MAC are different from each other, and may determine that the data node corresponding to the source IP address S_IP operates without the virtual machine 130 when the source data node MAC address S_DN_MAC and the data node MAC address DN_MAC are the same.

In addition, the name node 300 may determine that the name node 300 and a data node, which corresponds to the source IP address S_IP included in the header of the multiple address return packet P_MARE, operate on different physical hosts when the source name node MAC address S_NN_MAC and the name node MAC address NN_MAC are different from each other in the multiple address return packet P_MARE at operation S237. The name node 300 may determine that the name node 300 and the data node, which corresponds to the source IP address S_IP included in the header of the multiple address return packet P_MARE, operate on a same physical host when the source name node MAC address S_NN_MAC and the name node MAC address NN_MAC are the same in the multiple address return packet P_MARE at operation S238.

In addition, the name node 300 may determine that the data node, which corresponds to the source IP address S_IP included in the header of the multiple address return packet P_MARE, operates on a physical host corresponding to the source data node MAC address S_DN_MAC at operation S239.

In exemplary embodiments, the series of the operations S210, S220 and S230 may be performed repeatedly. According to exemplary embodiments, the series of the operations S210, S220 and S230 may be performed periodically or aperiodically.

Therefore, the name node 300 may update the node configuration periodically or aperiodically to update the configuration table CT. As a result, the distributed processing system 20 may continuously operate without a reboot even in a case in which the name node 300 and the plurality of data nodes 400-1, 400-2, 400-3, 400-4, 400-5, 400-6, 400-7, 400-8 and 400-9 migrate between the plurality of physical hosts 100-1, 100-2, 100-3 and 100-4.

Referring again to FIG. 17, the name node 300 may process data using a selected data node that is selected from among the plurality of data nodes 400-1, 400-2, 400-3, 400-4, 400-5, 400-6, 400-7, 400-8 and 400-9 based on the node configuration at operation S240.

Examples of operations of the name node 300 and the plurality of data nodes 400-1, 400-2, 400-3, 400-4, 400-5, 400-6, 400-7, 400-8 and 400-9 to select data nodes based on the node configuration and perform data processing commands using the selected data nodes are described above with reference to FIGS. 14, 15 and 16.

As described above with reference to FIGS. 1 to 20, according to exemplary embodiments, the name node 300 may operate as a master server controlling overall operations of the distributed processing system 20. The name node 300 may update the node configuration periodically or aperiodically even in a case in which at least one node from among the name node 300 and the plurality of data nodes 400-1, 400-2, 400-3, 400-4, 400-5, 400-6, 400-7, 400-8 and 400-9 migrates between the plurality of physical hosts 100-1, 100-2, 100-3 and 100-4. Therefore, the name node 300 may effectively control the distributed processing system 20 to perform data processing without a reboot regardless of a migration of the name node 300 and the plurality of data nodes 400-1, 400-2, 400-3, 400-4, 400-5, 400-6, 400-7, 400-8 and 400-9. As a result, performance of the distributed processing system 20 may be improved.

It is to be understood that the present inventive concept may be implemented in various forms of hardware, software, firmware, special purpose processors, or a combination thereof. In one exemplary embodiment, the present inventive concept may be implemented in software as an application program tangibly embodied on a program storage device. The application program may be uploaded to, and executed by, a machine comprising any suitable architecture.

According to an exemplary embodiment of the present inventive concept, a computer system supporting a distributed processing system and a method of operating the same includes, for example, a processor and a memory. The memory can include, for example, random access memory (RAM) or read only memory (ROM). Exemplary embodiments of the present inventive concept can be implemented as a routine that is stored in memory and executed by the processor.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of operating a distributed processing system including a name node and a plurality of data nodes, comprising:
   transmitting an address request packet from the name node to each of the plurality of data nodes;
   transmitting an address packet from each of the plurality of data nodes to the name node upon receiving the address request packet at each of the plurality of data nodes and upon each of the plurality of data nodes storing its own media access control (MAC) address in a payload of the address packet as a data node MAC address;
   determining, by the name node, a node configuration of the distributed processing system based on the address packet received from each of the plurality of data nodes; and
   processing data using a selected data node from among the plurality of data nodes based on the node configuration,
   wherein determining the node configuration comprises:
   reading a source name node MAC address and a name node MAC address from a payload of an address return packet and a source internet protocol (IP) address from a header of the address return packet; and
   determining whether the name node operates on a virtual machine by comparing the source name node MAC address and the name node MAC address.

2. The method of claim 1, wherein at least one node from among the name node and the plurality of data nodes operates on the virtual machine.

3. The method of claim 1, wherein each of the plurality of data nodes reads its own MAC address from an internal register, stores the read MAC address in the payload of the address packet as the data node MAC address, and transmits the address packet to the name node upon receiving the address request packet from the name node.

4. The method of claim 1, wherein the name node determines the node configuration based on a source MAC address included in a header of the address packet and the data node MAC address included in the payload of the address packet.

5. A method of operating a distributed processing system including a name node and a plurality of data nodes, comprising:
   transmitting an address request packet from the name node to each of the plurality of data nodes;
   transmitting an address packet from each of the plurality of data nodes to the name node upon receiving the address request packet at each of the plurality of data nodes and upon each of the plurality of data nodes storing its own media access control (MAC) address in a payload of the address packet as a data node MAC address;
   determining, by the name node, a node configuration of the distributed processing system based on the address packet received from each of the plurality of data nodes; and
   processing data using a selected data node from among the plurality of data nodes based on the node configuration,
   wherein determining the node configuration comprises:
   reading a source MAC address and a source internet protocol (IP) address from a header of the address packet, and the data node MAC address from the payload of the address packet; and
   determining whether a data node from among the plurality of data nodes corresponding to the source IP address operates on a virtual machine by comparing the source MAC address and the data node MAC address.

6. The method of claim 5, wherein the name node determines that the data node corresponding to the source IP address operates on the virtual machine when the source MAC address and the data node MAC address are different from each other.

7. The method of claim 5, wherein determining the node configuration based on the address packet received from each of the plurality of data nodes further comprises:
   determining whether the data node corresponding to the source IP address operates on a physical host corresponding to the source MAC address.

8. The method of claim 7, wherein the name node determines that data nodes from among the plurality of data nodes corresponding to source IP addresses included in address packets having a same source MAC address operate on a same physical host.

9. The method of claim 1, further comprising:
   selecting, by the name node, at least one data node from among the plurality of data nodes operating on the virtual machine as a virtual data node based on the node configuration;

transmitting the address request packet, repeatedly, from the name node to the at least one virtual data node;

transmitting the address packet from the at least one virtual data node to the name node upon receiving the address request packet at the at least one virtual data node and upon the at least one virtual data node storing its own MAC address in the payload of the address packet as the data node MAC address; and updating, by the name node, the node configuration based on the address packet received from the at least one virtual data node.

10. The method of claim 1, further comprising:

transmitting an address return request packet from the name node to each of the plurality of data nodes upon the name node storing its own MAC address in a payload of the address return request packet as the name node MAC address;

transmitting the address return packet from each of the plurality of data nodes to the name node upon receiving the address return request packet at each of the plurality of data nodes, and upon each of the plurality of data nodes storing a source MAC address in the payload of the address return packet as the source name node MAC address and storing the name node MAC address in the payload of the address return packet, wherein the source MAC address is included in a header of the address return request packet and the name node MAC address is included in the payload of the address return request packet; and determining, by the name node, the node configuration based on the address return packet received from each of the plurality of data nodes.

11. The method of claim 10, wherein the name node determines that the name node operates on the virtual machine when the source name node MAC address and the name node MAC address are different from each other in at least one of the address return packets received from the plurality of data nodes.

12. The method of claim 10, wherein determining the node configuration based on the address return packet received from each of the plurality of data nodes further comprises:

determining that the name node and a data node from among the plurality of data nodes corresponding to the source IP address included in the header of the address return packet operate on different physical hosts when the source name node MAC address and the name node MAC address are different from each other in the address return packet; and determining that the name node and the data node corresponding to the source IP address included in the header of the address return packet operate on a same physical host when the source name node MAC address and the name node MAC address are the same as each other in the address return packet.

13. The method of claim 10, wherein the name node transmits the address return request packet, repeatedly, to each of the plurality of data nodes upon storing its own MAC address in the payload of the address return request packet as the name node MAC address, and updates the node configuration based on the address return packet received from each of the plurality of data nodes.

14. The method of claim 1, wherein the distributed processing system uses a HADOOP framework.

15. A method of operating a distributed processing system including a name node and a plurality of data nodes, comprising:

transmitting a multiple address return request packet from the name node to each of the plurality of data nodes upon the name node storing its own media access control (MAC) address in a payload of the multiple address return request packet as a name node MAC address;

transmitting a multiple address return packet from each of the plurality of data nodes to the name node upon receiving the multiple address return request packet at each of the plurality of data nodes, upon each of the plurality of data nodes storing a source MAC address in a payload of the multiple address return packet as a source name node MAC address, upon each of the plurality of data nodes storing the name node MAC address in the payload of the multiple address return packet, and upon each of the plurality of data nodes storing its own MAC address in the payload of the multiple address return packet as a data node MAC address, wherein the source MAC address is included in a header of the multiple address return request packet and the name node MAC address is included in the payload of the multiple address return request packet;

determining, by the name node, a node configuration of the distributed processing system based on the multiple address return packet received from each of the plurality of data nodes; and processing data using a selected data node selected from among the plurality of data nodes based on the node configuration.

16. The method of claim 15, wherein determining the node configuration comprises:

reading the source name node MAC address, the name node MAC address, and the data node MAC address from the payload of the multiple address return packet, a source internet protocol (IP) address from a header of the multiple address return packet, and a source MAC address from the header of the multiple address return packet as a source data node MAC address;

determining whether the name node operates on a virtual machine by comparing the source name node MAC address and the name node MAC address; and determining whether a data node corresponding to the source IP address operates on the virtual machine by comparing the source data node MAC address and the data node MAC address.

17. The method of claim 16, wherein the name node determines that the name node operates on the virtual machine when the source name node MAC address and the name node MAC address are different from each other in at least one of the multiple address return packets received from the plurality of data nodes, and determines that the data node corresponding to the source IP address operates on the virtual machine when the source data node MAC address and the data node MAC address are different from each other.

18. The method of claim 16, wherein determining the node configuration further comprises:

determining that the name node and the data node corresponding to the source IP address operate on different physical hosts when the source name node MAC address and the name node MAC address are different from each other in the multiple address return packet, wherein the source IP address is included in the header of the multiple address return packet;

determining that the name node and the data node corresponding to the source IP address operate on a same physical host when the source name node MAC address and the name node MAC address are the same as each other in the multiple address return packet; and determining whether the data node corresponding to the source IP address operates on a physical host corresponding to the source data node MAC address.

19. The method of claim 15, wherein the name node transmits the multiple address return request packet, repeatedly, to each of the plurality of data nodes upon storing its own MAC address in the payload of the multiple address return request packet as the name node MAC address, and updates the node configuration based on the multiple address return packet received from each of the plurality of data nodes.

* * * * *